METHOD AND SYSTEM FOR PROGRAM LINKAGE AND COMMUNICATION MECHANISM FOR COMPUTERS

Filed Nov. 22, 1967 11 Sheets-Sheet 1

INVENTORS
EDWARD MORENOFF
JOHN B. McLEAN
BY Harry A. Herbert Jr. and George Fine
ATTORNEYS INVENTORS
EDWARD MORENOFF
JOHN B. McLEAN
BY Harry A. Herbert Jr and
George Fine
ATTORNEYS Feb. 16, 1971 E. MORENOFF ET AL 3,564,504

METHOD AND SYSTEM FOR PROGRAM LINKAGE AND COMMUNICATION MECHANISM FOR COMPUTERS

Filed Nov. 22, 1967 11 Sheets-Sheet 3

INVENTORS
EDWARD MORENOFF
JOHN B. McLEAN
BY Harry A. Herbert Jr and George Fine
ATTORNEYS INVENTORS
EDWARD MORENOFF
JOHN B. McLEAN
BY Harry A. Herbert Jr
George Fine and
ATTORNEYS INVENTORS
EDWARD MORENOFF
JOHN B. McLEAN
BY Harry A. Herbert Jr. and George Fine
ATTORNEYS INVENTORS
EDWARD MORENOFF
JOHN B. McLEAN
BY Harry A. Herbert Jr. and
George Fine
ATTORNEYS INVENTORS
EDWARD MORENOFF
JOHN B. MCLEAN
BY Harry A. Herbert Jr. and George Fine
ATTORNEYS INVENTORS
EDWARD MORENOFF
JOHN B. McLEAN
BY Harry A. Herbert Jr. and George Fine
ATTORNEYS INVENTORS
EDWARD MORENOFF
JOHN B. McLEAN BY Harry A. Herbert Jr
George Fine and
ATTORNEYS INVENTORS
EDWARD MORENOFF
JOHN B. McLEAN
BY Harry A. Herbert Jr.
and George Fine
ATTORNEYS INVENTORS
EDWARD MORENOFF
JOHN B. McLEAN
BY Harry A. Herbert Jr. and George Fine
ATTORNEYS

United States Patent Office 3,564,504
Patented Feb. 16, 1971

3,564,504

METHOD AND SYSTEM FOR PROGRAM LINKAGE AND COMMUNICATION MECHANISM FOR COMPUTERS

Edward Morenoff, Rockville, Md., and John B. McLean, Utica, N.Y., assignors to the United States of America as represented by the Secretary of the Air Force

Filed Nov. 22, 1967, Ser. No. 685,102
Int. Cl. G06f *9/18*
U.S. Cl. 340—172.5 7 Claims

ABSTRACT OF THE DISCLOSURE

A method and system for program linkage and communication mechanism in computers. The basic feature of the technique is the insertion of a Buffer File into each data flow path from one program to another. A Buffer Fle Control Word containing control and state information is associated with each Buffer File. There is provided a capability for simultaneously manipulating up to eight Buffer File Control Words, symbolically referencing them in a program, and verifying and controlling a Buffer File's access rights.

BACKGROUND OF THE INVENTION

This invention relates to digital computers and more particularly to a Buffer File computer program linkage and communication mechanism in a digital computer to facilitate the dynamic linking of asynchronously running programs during their execution, the passing of data between such programs, and the scheduling of the execution of such programs by the computer monitor system.

In the course of investigating existing methods for communication of data and control between programs, or the parts thereof, the present invention has been developed which advances the state-of-art. Whereas, in the past, inter- and intra-program communications have been largely treated on a static basis (for example, by employing compilation techniques which impose elaborate conventions on programmers wishing to use them) the present invention described herein provides a dynamic linking capability.

SUMMARY OF THE INVENTION

The Buffer File computer program linkage and communication mechanism of the present invention is comprised of the addition of a set of commands to the instruction repertoire of the computers; the addition of new storage registers called Buffer File Control Registers and the Access Control Register in the computer processing and control units; and the addition of decoding, interpretation and control circuits to be used in conjunction with these registers. The addition of these commands, storage registers and logic circuits to provide instrumentation for reading, writing, terminating and otherwise controlling the operation of the Buffer Files through which this invention requires all data exchanged between programs to pass. Thus one of the novel features of this invention is the concept of introducing a physical mechanism in a computer to perform the functions of: linking asynchronously running programs during their execution; passing data between such programs; performing some scheduling and computer resource allocation operations on such programs. Another novel feature is the introduction of Buffer Files between each output of each computer program which is to be used as one input to another computer program, and the introduction of the associated hardware control and storage elements to make the passage of all data from one program to another through such Buffer Files an efficient and economic operation.

The present invention provides an economic and efficient hardware mechanism which makes practical the combining of variable numbers of small, relatively simple, independently written programs to perform larger more complex jobs. This facilitates program debugging operations, reduces programming costs, simplifies the design and preparation of modular programs and reduces the complexity of the computer monitor system.

The key feature of the new invention is the introduction of what is herein defined as Buffer Files between each output of each computer program which is to be used as an input to another computer program. The operation of the Buffer Files for program linkage and communication purposes requires both hardware and software implementation in the computer. The Buffer File Computer Program Linkage and Communication Mechanism, which is the subject of this disclosure, is the reduction to practice of the hardware portions of the Buffer File operation. The mechanism is applicable to computers manufactured by more than one computer vendor and in fact, can be applied to essentially all digital computers. It is, however, more desirable to implement the mechanism on digital computers in which memory protection methods have been instrumented in either hardware or software. In such cases, protected areas of memory reserved for the computer's program monitor system can also be used by some of the software associated with the functioning of the Buffer File Computer Program Linkage and Communication Mechanism.

The Buffer File Computer Program Linkage and Communication Mechanism requires: the addition of a set of commands to the instruction repertoire of the computer; the addition of new storage registers called the Buffer File Control Registers (BFCR), the BFCR Symbolic Designation Translator (BSDT), and the Access Control Selector Register (ACSR) in the computer processing and control unit; and the addition of decoding, interpretation and control circuits to be used in conjunction with the Buffer File Control Registers (BFCR), the BSDT and the Access Control Selector Register. The implementation of such commands, registers and logical elements in a computer employs the standard, production line logic and circuit modules employed in the construction and fabrication of that computer. As such, detailed circuits implementation will vary from computer to computer and vendor to vendor.

The Buffer File mode of operation may be used to transfer both information normally throught of as moving in a stream from one program to another, and fixed type information (fixed with respect to position, not time) reflecting the state and condition of a program.

The Buffer File mode of operation can be implemented either within a single computer processor to permit the linking of programs in a multi-programmed environment, or within multiple computer processors to permit linking of programs in a multicomputer environment. When implemented for purposes of intracomputer communications, the Buffer Files reside in core storage and compete for storage allocation in the same manner as the programs which they link. When implemented for purposes of inter-computer communications, the Buffer Files reside in a random access storage device (shared core, drum, etc.) jointly assessible by each of the computers.

The Buffer File mode of operation can either be implemented exclusively in software within the framework of the computer's monitor system, or partially in software and partially in hardware. The reduction of portions of the Buffer File control mechanism to hardware increases both the speed and efficiency of the Buffer File mode of operation. There is more than one way in which the hardware portion of the Buffer File control mechanism can be designed. The details of the design reflect such characteristics peculiar to the computer on which it is being implemented as its word length and instruction format.

In this specification, one implementation of the hardware portion is described. The target machine against which the implementation is based is the General Electric-645 computer system which is shown and described in the GE-545 Systems Manual, CPB 1231, GE Computer Department, Phoenix, Ariz., published and copyrighted April 1966. Of course, other conventional computers may incorporate the present invention.

An object of the present invention is to provide a method and system for program linkage and communication mechanism for computers.

Another object of the present invention is to provide a method and system for effecting inter-program communications in a computer.

Yet another object of the present invention is to provide a method and system in a computer to transfer both information moving in a stream from one program to another, and fixed tape information reflecting the state and condition of a program.

The various features of novelty which characterize this invention are pointed out with particularity in the claims annexed to and forming a part of this specification. For a better understanding of this invention, however, its advantages and specific objects obtained with its use, reference should be had to the accompanying drawings and descriptive matter in which is illustrated and described a preferred embodiment of the invention.

DESCRIPTION OF THE PREFERRED EMBODIMENT

Now referring in detail to the method and system of this invention, the Buffer File mode of operation is characterized by the introduction of Buffer Files through which all inter-program communications are achieved. The flow of data between programs is always unidirectional, from an output of one program through a Buffer File to an input of another program. Once data has been transferred from a program to its output Buffer File, that data is no longer accessible to the program. Similarly, once a program has read data from its input Buffer File, that data can not be read a second time from the Buffer File by the program. These restrictions on the flow of data through the Buffer File result in a simple program synchronization mechanism which will be discussed hereinafter.

Figure 1:
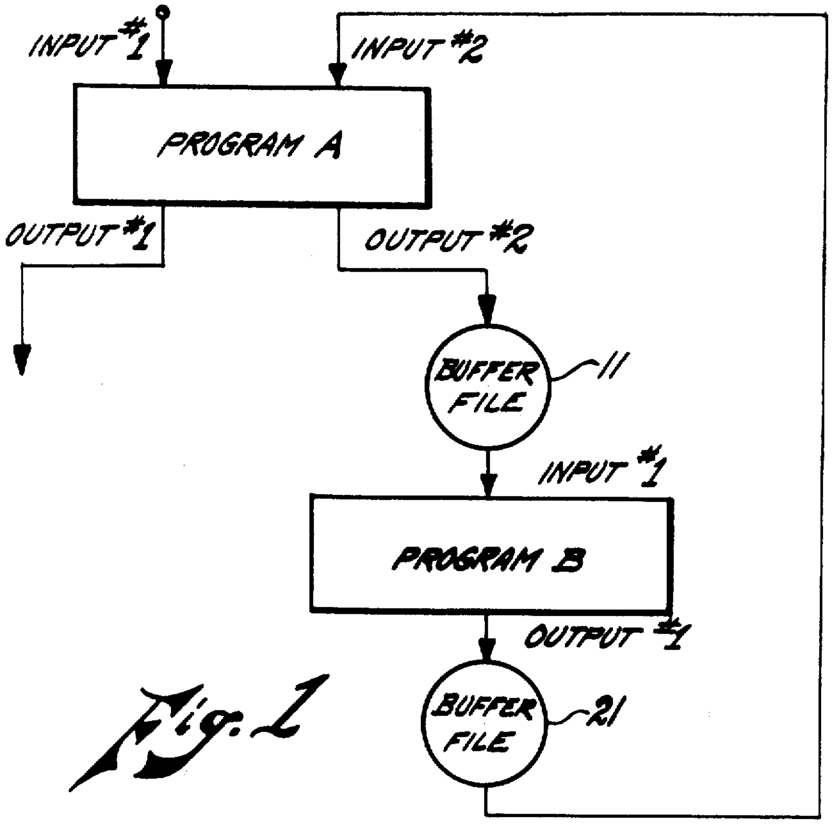
FIG. 1 illustrates a logical representation of the use of Buffer Files to link programs.

A logical representation of the use of Buffer Files to link programs is illustrated in FIG. 1. Note that although only a unidirectional flow of information is permitted through each of Buffer Files 11 and 21, there is a bidirectional communication between the two programs A and B. This is realized by the establishment of separate Buffer Files 11 and 21 whose directions of data flow are in opposite directions.

Figure 2:
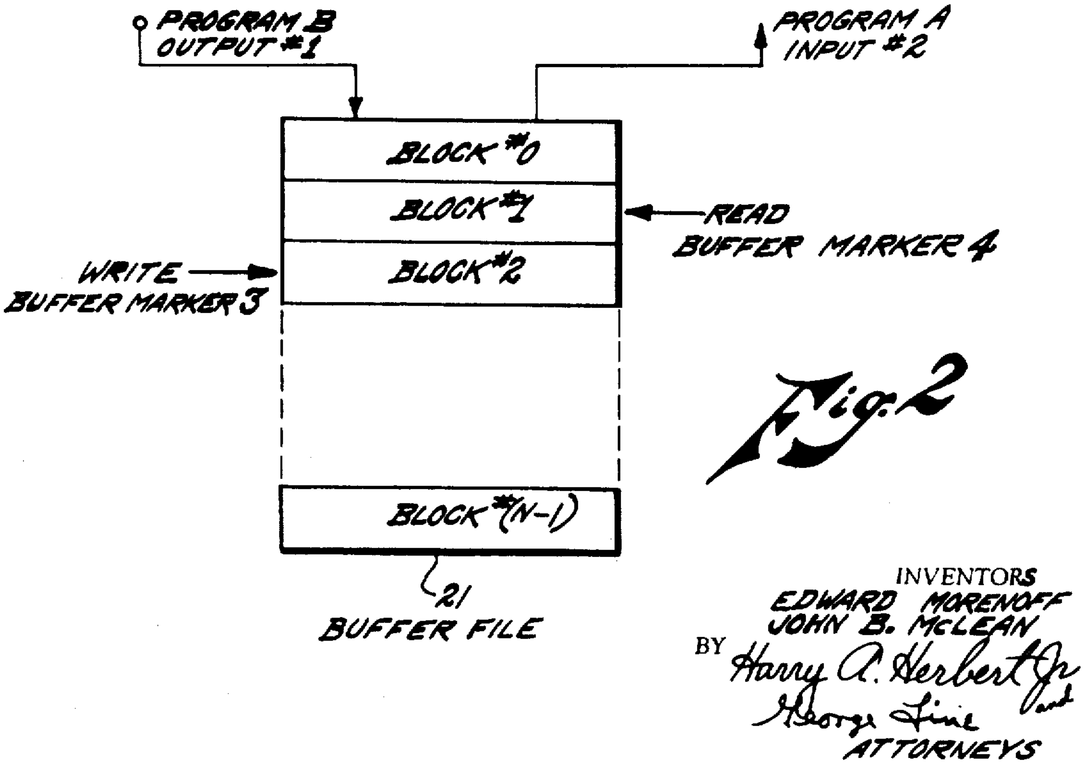
FIG. 2 illustrates the conceptional representation of one of two Buffer Files shown in FIG. 1.

The conceptual representation of one of the two Buffer Files shown in FIG. 1 is illustrated in FIG. 2. Buffer File 21 shown links the first output of Program B to the second input of Program A. The data in Buffer File 21 is organized as fixed length units called blocks. There are M computer words per block and N blocks per Buffer File.

In order that all blocks in a Buffer File be positionally equivalent, the Buffer File closes around itself in a ring structure. There are two markers associated with each Buffer File, one indicating the name of the block to which data is to be written and the other from where the data is to be read. As shown in FIG. 2, Write Buffer Marker 3 is incremented by one each time a block of data is placed in Buffer File by the first output of Program B. Read Buffer Marker 4 is incremented by one each time a block of data is read from the Buffer File by the second input of Program A. The markers are incremented using modulo N arithmetic.

When Read Buffer Marker 4 and the Write Buffer Marker 3 coincide *and* the two markers have recycled the same number of times, then Program A has read all the data thus far placed in the Buffer File by Program B. Hence, any read operation attempted by Program A under this condition must be inhibited. Similarly, when Read Buffer Marker 4 and White Buffer Marker 3 coincide *and* Write Buffer Marker 3 has recycled one more time than Read Buffer Marker 4, there is no further space for Program B to write in the Buffer File. Hence, any write operation attempted by Program B under this condition must be inhibited. Finally, since only a unidirectional flow of data is permitted through a Buffer File, any attempt by Program A to write data to the Buffer File or Program B to read data from the Buffer File must also be inhibited. As soon as the presence of any of these inhibit conditions is detected by the Buffer Filer control mechanim, control is immediately returned to the computer's computer's monitor system, thus inhibiting the execution of the read and write Buffer File operation.

The mechanism for synchronizing the execution of concurrently running linked programs is inherent in this operation of the Buffer Files. The program writing data to a Buffer File cannot proceed beyond the point in its execution when it is necessary to place data in the Buffer File and there is no space for additional data in the Buffer File. The program must then wait to proceed until the program reading data from that Buffer File has made additional space available by reading some of the data currently in the Buffer File. Similarly, the program reading data from the Buffer File cannot proceed beyond the point in its operation when it requires data from the Buffer File *and* there is no additional data in that Buffer File. The program must then wait to proceed until the program writing data to the Buffer File has made additional ata available by placing some new data in the Buffer File.

The temporary delay of a program, either waiting for additional data in its input Buffer File or for additional space in its output Buffer File, is effected automatically by the transfer of control to the computer's monitor system (the computer system utilized, in this instance, is the GE-645) each time a program attempts to read or write its Buffer File under such conditions. The monitor system may at any time arbitrarily transfer control to either of the two programs which then resumes at the point at which control is returned. Should the processing of that program still have to be delayed, an attempt by the program to read or write the Buffer File will again immediately return control to the monitor system.

In addition to being able to automatically withdraw control from a program when it is unable to proceed, the Buffer File mode of operation may also be employed to regulate the rate of execution of a program by adjusting the sizes of the program's input and output Buffer Files. Changing the size of the Buffer File modulates the flow of data through a program and hence also the rate at which the program may operate on that data. The Buffer File mode of operation may thus be used by the computer's monitor system as a basic scheduling and resource allocation mechanism upon which more complex sophisticated algorithms can be built.

The use of the Buffer File mode of operation to convey program state information from one program to another generally involves the use of a pair of Buffer Files so that bidirectional communications can be effected. This type of information can most efficiently be transferred if the flags, indicators, counters and registers reflecting the state of he program are concentrated into "communications" blocks. The size of the communications block is chosen on the basis of the quantity of information to be passed between the programs.

The nature of the change in the internal state of a program can be recorded as an updated copy of the communications block in the output Buffer File associated with that program. This causes the Write Buffer Marker to be advanced by one. If the positions of the Write and Read Buffer Markers were initially equal, then the change in state of the program causes this marker equality to be destroyed. The fact that there has been a change in state in the program can readily be sensed by the other program which then and only then is permitted to read a block of data from the Buffer File. This causes the Read Buffer Marker to be advanced by one. Hence, the detection of the change in state of the first program by the second program causes the marker equality to be restored. The second program can then determine the nature of the change in state of the first program by the examination of the contents of the communications block it has read from the Buffer File.

There are many instances when a program, which would otherwise have to be temporarily delayed while waiting for additional data in one of its input Buffer Files or for additional space in one of its output Buffer Files could, if given the opportunity, continue to operate on instructions not directly dependent on the elimination of the inhibit condition for their execution. This is the case, for example, when the Buffer Files are used to communicate state information between programs. A point may be reached in the execution of a program where a logical decision is to be made as to which one of a set of multiple alternative paths is to be followed, the decision being a function of the state of another program to which it is linked via a Buffer File. An indication that the second program has not yet changed state, as reflected by the fact that the first program is unable to read a block of data from the Buffer File when it atempts to do so, may be sufficient information on which to base the decision and allow the processing of the first program to continue.

In order to cope with such situations, an option is incorporated in the Buffer File mode of operation by which a program may continue to be exectued although it is inhibited from transferring data to or from a Buffer File containing insufficient new data or additional spuace. This is further discussed hereinafter.

The application of the Buffer File mode of operation to computer systems designed to provide on-demand service to multiple users (via devices such as on-line typewriters or CRT query/response consoles) has an additional benefit. The Buffer File mode of operation facilitates the passage of partial results to a second program before the preceding program has completed its operation. The utility of being able to pass partial results between programs in such environments is related to the ability to make a part of the total data available to a user at his console in a shorter time period than would be required to make all the data available to him. Since he can only examine and analyze finite amounts of information at one time, this method of operation permits him to make use of the data at this console at the same time the program continues generating additional data.

The particular implementation of Buffer File mode of operation is applicable for program communications in both intracomputer environments and inter-computer environments in which the multiple processors share a common core.

The symbolic names by which a program internally refers to its input and output Buffer Files are defined at the time the program is designed. The definition of which program outputs are to be linked with which program inputs may occur at any time following this program design phase. The linkage definition consists of equating the symbolic names assigned to the output and input Buffer Files of the program outputs and inputs to be linked.

The actual linkage of the specified program outputs and inputs does not, however, occur until that point is reached in the execution of one of the programs to be linked where a request is made for the creation of the Buffer File. Thus, although multiple outputs may be specified in a program to cover a set of mutually exclusive conditions, Buffer Files are created only for those outputs which the program actually selects on the basis of the data being processed.

Either of the two programs to be linked by a particular Buffer File may be the first to reach the point in its execution where it requests the creation of the Buffer File. In response to the request which occurs first, the Buffer File control mechanism generates a Buffer File Control Word (BFCW) for the requested Buffer File and establishes a correspondance between the Buffer File Control Word (BFCW) and the symbolic name by which the Buffer File is internally referred to in the program. When the other program to be linked to that Buffer File reaches the point in its execution where it requests the creation of the Buffer File, a correspondence is established between the symbolic name used to refer to the Buffer File and the previously generated Buffer File Control Word (BFCW).

The Buffer File Control Word (BFCW) contains information for controlling and maintaining the record of the state of the operation of the associated Buffer File. This includes the location and size of the Buffer File and the positions of the Read and Write Buffer Markers. One Buffer File Control Word (BFCW) is maintained by the monitor system, within an area of core dedicated for its use, for each Buffer File that has been created.

The manipulation of the Buffer File Control Word (BFCW) is one of the functions associated with the Buffer File mode of operation which is implemented in hardware. This is accomplished by providing a Buffer File Control Register (BFCR) to which the Buffer File Control Word (BFCW) is transferred prior to the execution of an instruction referencing the associated Buffer File, and the logic circuitry needed to operate on the contents of the Buffer File Control Register (BFCR). The transfer of the Buffer File Control Word (BFCW) to the Buffer File Control Register (BFCR) is separated from the transfer of data with the associated Buffer File, rather than incorporated as an integral part of the instruction to read or write the Buffer File. This eliminates the overhead which would result from preceding each Buffer File transfer with an additional memory access to load the Buffer File Control Register (BFCR). The loading and storing of the contents of the Buffer File Control Register (BFCR) is very much analogous to the corresponding operations in conventional computer index registers.

The overhead associated with referencing multiple input and output Buffer Files in a program is reduced by the use of multiple Buffer File Control Registers. The availability of only a single Buffer File Control Register (BFCR) would mean that a program must save the Buffer File Control Word (BFCW) associated with the currently referenced Buffer File, before loading the Buffer File Control Word associated with the new Buffer File to be referenced into the Buffer File Control Register (BFCR). This serves to make a simple operation like streaming data from a program's input Buffer File through the Accumulator Register (where logical and/or arithmetic operations can be executed) to a program's output Buffer File a considerably time consuming operation. The availability of multiple Buffer File Control Registers enables the Buffer File Control Word (BFCW) associated with the input Buffer File to be maintained in one Buffer File Control Register (BFCR) and the Buffer File Control Word (BFCW) associated with the output Buffer File in another Buffer File Control Register (BFCR) for the duration of the operation. Although multiple Buffer File Control Registers are provided, a program may still exercise the option of using the same Buffer File Control Register (BFCR) for multiple Buffer File Control Words. In that case, however, it is the program's responsibility to properly load and store the contents of the Buffer File Control Register (BFCR).

In the time-shared multiprogramming environments, where control may pass from one program to another before the completion of the first program, it is the responsibility of the computer's monitor system to temporarily save the contents of the Buffer File Control Registers being used by a program to be suspended and restore them prior to re-activating the suspended program. The utility of the multiple Buffer File Control Registers in such an environment is increased by treating all Buffer File Control Register (BFCR) designations in running programs symbolically. A BFCR Translator Vector (BTV) is established by the monitor system for each program brought into core storage for execution. The BFCR Translator Vector (BTV) maps the symbolic Buffer File Control Register (BFCR) designations appearing in the program to the physical Buffer File Control Registers implemented in the hardware. The monitor system thereby has the opportunity to dynamically modify the assignment of the Buffer File Control Registers to a running program many times during the program's execution in order to optimize their use in the multiprogrammed environment.

The translation of the symbolic Buffer File Control Register (BFCR) designations into physical Buffer File Control Register (BFCR) designations is a second function associated with the Buffer File mode of operation which can be implemented in hardware. This is accomplished by providing a Buffer File Control Register (BFCR) symbolic Designation Translator (BSDT) to which the BFCR Translator Vector (BTV) is transferred by the monitor system prior to its turning control over to the corresponding program to be executed, and the logic circuitry to operate on the contents of the BSDT.

A running program need not, however, always use all the Buffer File Control Registers implemented in the hardware during its execution. It is therefore not always necessary for the monitor system to save the contents of all of the Buffer File Control Registers before turning control over to a new program. Instead, only as many Buffer File Control Registers need be saved as are required to hold the Buffer File Control Words for the new program to which control is to be transferred. The monitor system must, however, insure that a program does not inadvertently gain access to an otherwise inaccessible Buffer File by referencing a Buffer File Control Register (BFCR) containing a Buffer File Control Word (BFCW) from another program. This is accomplished by providing a mechanism by which the monitor system can check the accessibility rights of a program to a Buffer File before permitting such access to be made. In regard to access rights considerations, the monitor system must also inure that the flow of data through a Buffer File is only in one direction. This is accomplished by granting a program only read access to its input Buffer Files and only write access to its output Buffer Files.

An Access Control Selector Word (ACSW) is established by the monitor system for each program brought into the core for execution. The Access Control Selector Word (ACSW) contains the access rights vertification information. This information is used both to restrict the ability of a program to reference a Buffer File Control Register and to prevent a program from writing data to its input Buffer File or reading data from its output Buffer File.

The verification of a program's access rights to a Buffer File is a third function which can be implemented in hardware. This is accomplished by providing an Access Control Selector Register (ACSR) to which the Access Control Selectro Word (ACSW) is transferred by the monitor system prior to its turning control over to the corresponding program to be executed, and the logic circuitry to operate on the contents of the Access Control Selector Register (ACSR).

The major registers associated with the hardware implementation of the Buffer File mode of operation were identified hereinbefore. These registers, together with the associated logic and control circuitry are referred to as the Buffer File Computer Program Linkage and Communication Mechanism, or simply as the Linker. The structure of these registers and their relationship to other elements normally contained in a computer's processing and control unit are hereinafter described.

Figure 3:
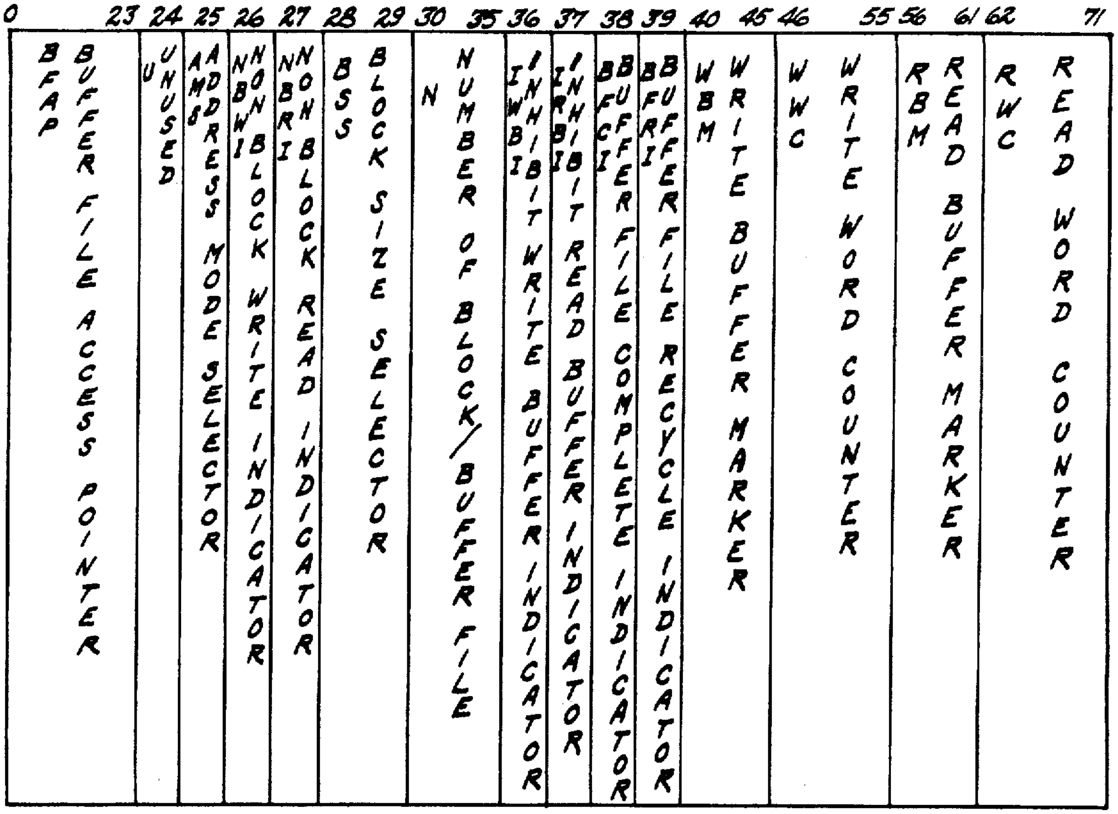
FIG. 3 shows the structure of a Buffer File Control Register (BFCR) utilized in a preferred embodiment of this invention.

The design implementation provides for eight Buffer File Control Registers. The structure of a Buffer File Control Register (BFCR) is shown in FIG. 3. The 72-bit register length corresponds to a double length word of the GE–645 computer system. The data fields are located within 72-bit frame in a manner which facilitates their handling as two 36-bit words, eight 9-bit characters or twelve 6-bit characters.

Bit 25 is designated as the Address Mode Selector (AMS). The Address Mode Selector (AMS) is required when the Linker is implemented in computers such as the GE–645 in which there is a choice of ways in which a word in core storage may be addressed. Depending on the mode of operation of the computer, a word in core storage may be located either by a conventional one-dimensional address which directly specifies a physical location in core storage, or by a two-dimensional logical address which must first be translated into a physical address prior to the actual memory access being made. In the GE–645 [3,4], the two-dimensional address is made up of a segment number and a segment address. A segment number uniquely specifies one of the segments into which a program may be divided. The segment address specifies the position of the word in the segment, relative to the segment origin.

When the Address Mode Selector (AMS) is set to one, address information contained in the Buffer File Control Register (BFCR) is treated on a conventional one-dimensional basis. When the Address Mode Selector (AMS) is set to zero, however, address information is treated on a two-dimensional basis.

Bits 28 and 29 are designated as the Block Size Selector (BSS). There are four different Buffer File block sizes available in the Linker. This includes blocks of 1, 8, 64 or 1024 words in length. The 64 and 1024 block sizes correspond to the two page sizes available in the GE–645. When paging is employed in the GE–645 [3,4], each segment address is partitioned into two parts before it is used for address selection within a segment: a page number and a word number. The page number uniquely specifies one of the pages into which a segment may be divided and the word number specifies the position of the word in the page.

It is not necessary for the Buffer File block size to correspond to the page size. Both the paging and Buffer File block transfer operations are automatically handled by the hardware and are transparent to the program. Based on the manner in which the segment address in the GE–645 is partitioned however, one restriction must be observed. When the page size of 64 is employed in the GE–645, the maximum number of words which can be contained in a segment must be limited to 16,384. Hence, if a block size of 1024 is employed with a page size of 64, the maximum size of the Buffer File must be limited to 16 blocks.

A Block Size Selector (BSS) value of zero corresponds to a one word block size. Similarly, Block Size Selector (BSS) values of one, two and three correspond to block sizes of 8, 64 and 1024 words, respectively.

Figure 4:
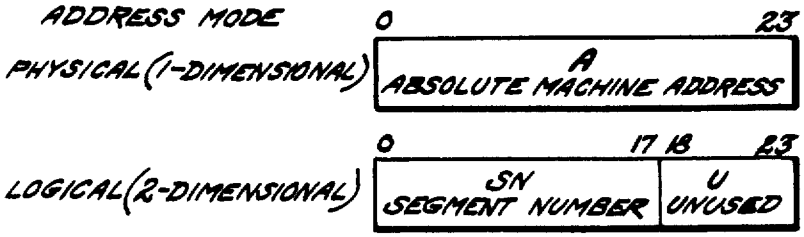
FIG. 4 shows the structure of a Buffer File Address Pointer (BFAP) utilized in a preferred embodiment of this invention.

Bits 0 through 23 are designated as the Buffer File Address Pointer (BFAP). The Buffer File Address Pointer (BFAP) locates the origin of the associated Buffer File. When a logical two-dimensional address is specified (by an Address Mode Selector (AMS) setting of zero) the first 18 bits of the Buffer File Address Points (BEAP) are used to specify the segment number of the corresponding Buffer File. Each Buffer File is contained in a different segment. The segment number locates the segment origin by reference to a Segment Descriptor Word contained in the Descriptor Segment [3] of that program. The origin of the segment is identical to the origin of the Buffer File. When a one-dimensional address is specified (by an Address Mode Selector (AMS) setting of one) the Buffer File Address Points (BFAP) is directly interpreted as the ordinal number identifying one of $2^{24}$ possible physical locations in core storage. The two structures of the Buffer File Address Pointer (BFAP) are shown in FIG. 4.

Bits 40 through 45 and 56 through 61 contain the Write Buffer Marker (WBM) and Read Buffer Marker (RBM), respectively. The Write Buffer Marker (WBM) indicates the number of the block of the Buffer File to which data is to be written and the Read Buffer Marker (RBM) indicates the number of the block from which data is to be read. Any one of up to 64 blocks may be specified by the 6-bits allocated to each of these fields.

Bits 46 through 55 and 62 through 71 contain the Write Word Count (WWC) and Read Word Count (RWC), respectively. The Write Word Count (WWC) indicates the number of the next word of the block to be written into the Buffer File, while the Read Word Count (RWC) indicates the number of the next word of the block to be read from the Buffer File. Any one of up to 1024 words may be specified by the 10-bits allocated to each of these fields.

Taken together, the Write Buffer Marker (WBM) and Write Word Count (WWC) or the Read Buffer Marker (RBM) and Read Word Count (RWC) uniquely specify the address of the next word to be transferred to or from the Buffer File, respectively, relative to the origin specified by the Buffer File Address Pointer (BFAP). If the Address Mode Selector (AMS) is set to one, this address is found by directly adding the 16-bit field consisting of either the Write Buffer Marker (WBM) and Write Word Count (WWC) or the Read Buffer Marker (RBM) and Read Word Count (RWC) to the lower order 18-bits of the Buffer File Address Pointer (BFAP). If the Address Mode Selector (AMS) is set to zero, the 16-bit field consisting of either the Write Buffer Marker (WBM) and Write Word Count (WWC) or the Read Buffer Marker (RBM) and Read Word Count (RWC) is treated as the segment address with respect to the segment number specified by the Buffer File Address Pointer (BFAP). This logical address is converted to a physical machine address using the address translation and relocation circuits present in the GE–645.

Bit 39 is designated as the Buffer File Recycle Indicator (BFRI). When a Buffer File Control Word (BFCW) is generated, the Buffer File Recycle Indicator (BFRI) is set to zero. Thereafter, each time either the Write Buffer Marker (WBM) or Read Buffer Marker (RBM) recycles the value of the Buffer File Recycle Indicator (BFRI) is inverted. A setting of zero means that the Write Buffer Marker (WBM) and Read Buffer Marker (RBM) have recycled the same number of times. Hence, if Write Buffer Marker (WBM) equals Read Buffer Marker (RBM) *and* Buffer File Recycle Indicator (BFRI) equals zero, the read operation should be inhibited. When this condition is detected the Inhibit Read Buffer Indicator (IRBI) contained in bit 37 is set to one. A Buffer File Recycle Indicator (BFRI) setting of one, however, means that the Write Buffer Marker (WBM) has recycled one more time than the Read Buffer Marker (RBM). Hence, if the Write Buffer Marker (WBM) has recycled one more time than the Read Buffer Marker (RBM) *and* Buffer File Recycle Indicator (BFRI) equals one, the write operation should be inhibited. When this condition is detected, the Inhibit Write Buffer Indicator (IWBI) contained in bit 36 is set to one.

Bit 38 is designated as the Buffer File Complete Indicator (BFCI). This bit is set to one when the program writing data to the Buffer File has no further data to send to the Buffer File.

Bit 26 is designated as the Non Block Write Indicator (NBWI). If bit 26 is set to zero and the condition arises that there is no further space in the Buffer File to write additional data, then the write operation is inhibited and the program is delayed in its execution until additional space becomes available. On the other hand, if 26 is set to one, and the same condition arises, then although the write operation to the Buffer File is inhibited, the program may continue to operate on the other instructions not associated with the Buffer File. Further, when the program reading data from that Buffer File finally reaches a point in its execution when it makes additional space available in the Buffer File, control is transferred to the monitor system where this may be duly noted. When control eventually returns to the program writing data to that Buffer File, it may either now write to the previously filled Buffer File or continue doing another program operation. This choice remains in the running program. Bit 27 is used in an analogous manner with respect to the Buffer File read operation.

Bit 24 is reserved for other functions which make use of some of the Linker logic but are not directly associated with the Buffer File mode of operation.

Figure 5:
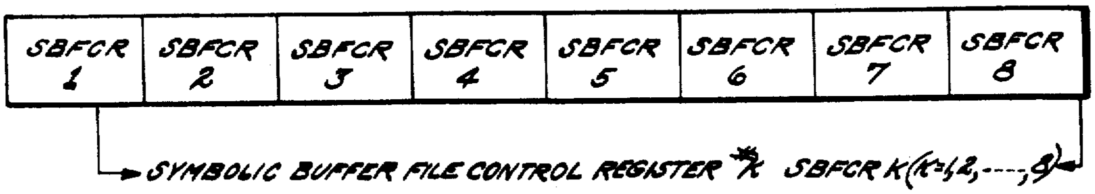
FIG. 5 shows the structure of a Buffer File Control Register Symbolic Designation Structure (BSDT) utilized in the preferred embodiment of this invention.

The structure of the BFCR Symbolic Designation Translator (BSDT) is shown in FIG. 5. The BFCR Symbolic Designation Translator (BSDT) consists of eight 3-bit subfields, one corresponding to each of the eight possible Buffer File Control Registers which may be symbolically referenced. The content of a 3-bit subfield is an ordinal number corresponding to the name of the Buffer File Control Register (BFCR) to which the reference should actually be made. The operation of the BFCR Symbolic Designation Translator (BSDT) causes a symbolic Buffer File Control Register (BFCR) reference to specify one of the eight BFCR Symbolic Designation Translator (BSDT) subfields from where the designation of a physical Buffer File Control Register (BFCR) can be obtained. The program thereby references the physical Buffer File Control Register (BFCR) indicated by the BFCR Symbolic Designation Translator (BSDT), rather than the symbolic Buffer File Control Register (BFCR) specified by the program instruction.

Figure 6:
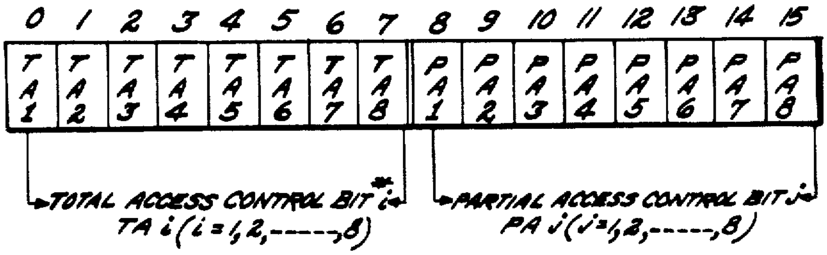
FIG. 6 shows the structure of The Access Control Selector Register (ACSR) utilized in the preferred embodiment of the present invention.

The structure of the Access Control Selector Register (ACSR) is shown in FIG. 6. The Access Control Selector Register (ACSR) is made up of two parts: the Total Access Control Field (TACF) and the Partial Access Control Field (PACF). Each part is 8-bits in length, one bit in each field corresponding to one of the eight Buffer File Control Registers.

The Total Access Control Field (TACF) is used to totally deny a running program access to a particular Buffer File Control Register (BFCR). A setting of one in any of the bits of the Total Access Control Field (TACF) causes any reference in a running program to the corresponding Buffer File Control Register (BFCR) to return control to the monitor system. A setting of zero, however, allows the program reference to the corresponding Buffer File Control Register (BFCR) to proceed.

The Partial Access Control Field (PACF) is used to insure the unidirectional flow of data through the Buffer File. A setting of one in any of the bits of the Partial Access Control Field (PACF) causes an attempted write operation to the associated Buffer File to be inhibited. A setting of zero, on the other hand, causes an attempted read operation to be inhibited.

Figure 7:
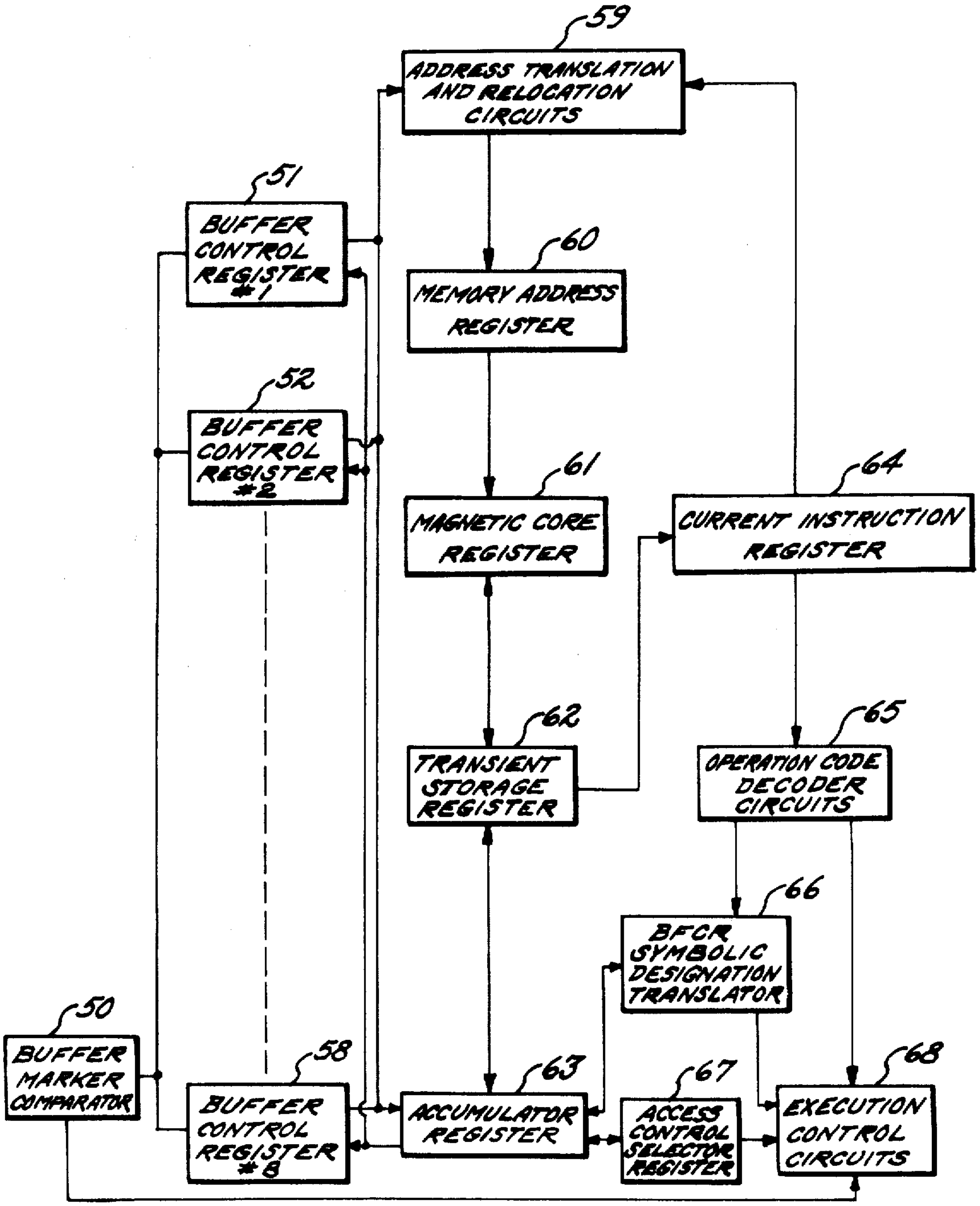
FIG. 7 is a Linker block diagram which shows the information flow in the preferred embodiment of the present invention.

The relationship of the functional components of the Linker to the elements conventionally found in a computer processing and control unit such as the GE-645 is shown in FIG. 7. Connecting lines between the registers and circuits indicate paths of flow of information and control signals. All paths are shown as single lines to simplify the diagram. Data transfers, however, actually occur in parallel over multiple lines.

Components in FIG. 7 such as Address Translation and Relocation Circuits 59, Memory Address Register 60, Magnetic Core Register 61, Transient Storage Register 62, Accumulator Register 63, Current Instruction Register 64, Op Code Decoder Circuits 65, and Execution Control Circuits 68 are representative of the elements conventionally found in a processing and control unit of a computer such as GE-645. Although the labels, organization and detailed circuit implementation will generally be different for different computers, the functions they perform must be provided for in essentially any general purpose computer.

Instructions to be executed and data to be operated on are taken from Magnetic Core Storage 61. It is desirable, but not essential, that the contents of the memory locations in Magnetic Core Storage 61 be capable of being read and/or write protected by methods implemented in either the hardware or software of the computer. Protected areas dedicated for use of the computer monitor system can be used for the storage of Buffer File Control Words, Access Control Selector Words and Buffer File control Register (BFCR) Translation Vectors. A read/write protection capability is available for use on the GE-645 [3]. Memory Address Register 60 holds the address of the operand or the instruction currently being referenced in Magnetic Core Storage.

Transient Storage Register 62 temporarily holds the operands being transferred to or from Magnetic Core Storage 61, and the instructions being read from Magnetic Core Storage 61. The operands are sent either to Accumulator Register 63 or to some other register specified in the instruction being executed. The instructions are sent to Current Instruction Register 64.

Op Code Decoder 65 is utilized to identify and interpret the new instructions added to the repertoire of the computer. Similarly, the circuits required to provide the control and timing signals for the execution of the new instructions are provided by conventional Execution Control Circuits 68.

It is to be noted that Buffer File Control Registers 51–58, BRCR Symbolic Buffer File Register 66, and Access Control Register 67 are all the conventional type of computer registers. The registers are combinations of binary storage cells and sets of gates which control the logical operation of the storage cells.

The storage cells can be any bistable device that is any device with two stable states. A commonly used device is a standard "flip-flop" circuit in which the active elements may be either transistors or vacuum tubes. Another type device which may be used is of magnetic material such as ferrite cores. A third type might be a simple DC battery used in conjunction with a two position open/close switch. The sets of gates can be made of any device or combination of devices which allow the logical "and," "or" and "not" functions to be realized. They may be either diode, transistor, vacuum tube, cyrogenic, thin film or any other comparable technologies known to the state-of-the-art.

The components shown in FIG. 7 are conventional and may be such as shown and described in the aforementioned GE-645 Systems Manual, GPB 1231, published and copyrighted April 1966. It is again emphasized that other conventional computers include identical components such as shown in FIG. 7 so that Memory Address Register 60 may be such as referenced at page 208 of "Theory and Design of Digital Machines" by Bartee, Reed, and Lebow published by McGraw-Hill (1962) and also reference as the ADR Register at page II–7 of the GE-625/635 Program Reference Manual CPB-10004D, Computer Equipment Dept., General Electric Co. (January 1966). Transient Storage Register 62 may be such as referenced as M-Register at page II–7 of the GE-625/635 Program Reference Manual CPB-10004D Computer Equipment Dept., General Electric Co. (January 1966) or referenced as Storage Register at page 9 of IBM 7090 Data Processing System, Form A22-6528-2 published February 1961. Accumulator Register 63 may be such as referenced at page 209 of "Theory and Design of Digital Machines" by Bartee, Reed, and Lebow published by McGraw-Hill Co. in 1962 or as referenced at page 342 in "Logical Design of Digital Computers" by Phister published by John Wiley and Sons, Inc. in 1958. Current Instruction Register 64 may be such as referenced as Instruction Register at page 9 of IBM 7090 Data Processing System, Form A22-6649-2 published February 1963 or as referenced as the COE/YE, COO/YO Register at page II–7 of GE-625/635 Program Reference Manual, CPB-10004D, Computer Equipment Dept., General Electric Co. (January 1966). Op Code Decoder Circuits 65 may be such as referenced as C, N, P Registers, at page 351 of "Logical Design of Digital Computers" by Phister published by John Wiley and Sons, Inc., 1958, or as referenced as F, T Registers at page 212 of "Theory and Design of Digital Machines" by Bartee, Reed, and Lebow published by McGraw-Hill Book Co., 1962. Execution Control Circuits 68 may be such as referenced as Bit Time Counter at pages 355/372 of "Logical Design of Digital Computers" by Phister published by John Wiley and Sons, Inc., 1958, or as referenced as Timing Counter, Clock Pulse Generator at pages 209/217 of Theory and Design of Digital Machines published by McGraw-Hill Book Co., 1962. Address Translation and Relocation Circuits 59 may be such as referenced as Base Address Registers, Index Registers, YS-ADDER, RS-ADDER, BS-ADDER at pages II–7, 8 of GE-625/635 Program Reference Manual, CPB-10004D (January 1966) or as referenced as Index Registers at page 229 of "Theory and Design of Digital Machine" by Bartee, Reed, and Lebow published by McGraw-Hill Book Co., 1962. Magnetic Core Storage 61 may be such as referenced as Magnetic Core Storage Section at pages 1-3 of Control Data 1604-A Computer Reference Manual, Pub. No. 60024500 by Control Data Corp., March 1965 or as referenced as Magnetic Core Storage Units at page I-1 of GE-625/635 Program Reference Manual CPB-10004D by The Computer Equipment Dept., of General Electric Co. (January 1966).

Buffer Marker Comparator (BMC) 50 of FIG. 7 is employed to compare the values of the Read and Write Buffer Markers indicated in FIG. 2. Its operation is such that an output is desired only when all "X" bit positions of the Read Buffer Marker are identical to the "X" bit positions of the Write Buffer Marker. There are many possible conventional logical circuits which can be used to instrument this function, and many ways in which the logical circuits can be reduced to physical circuits.

Figure 7A:
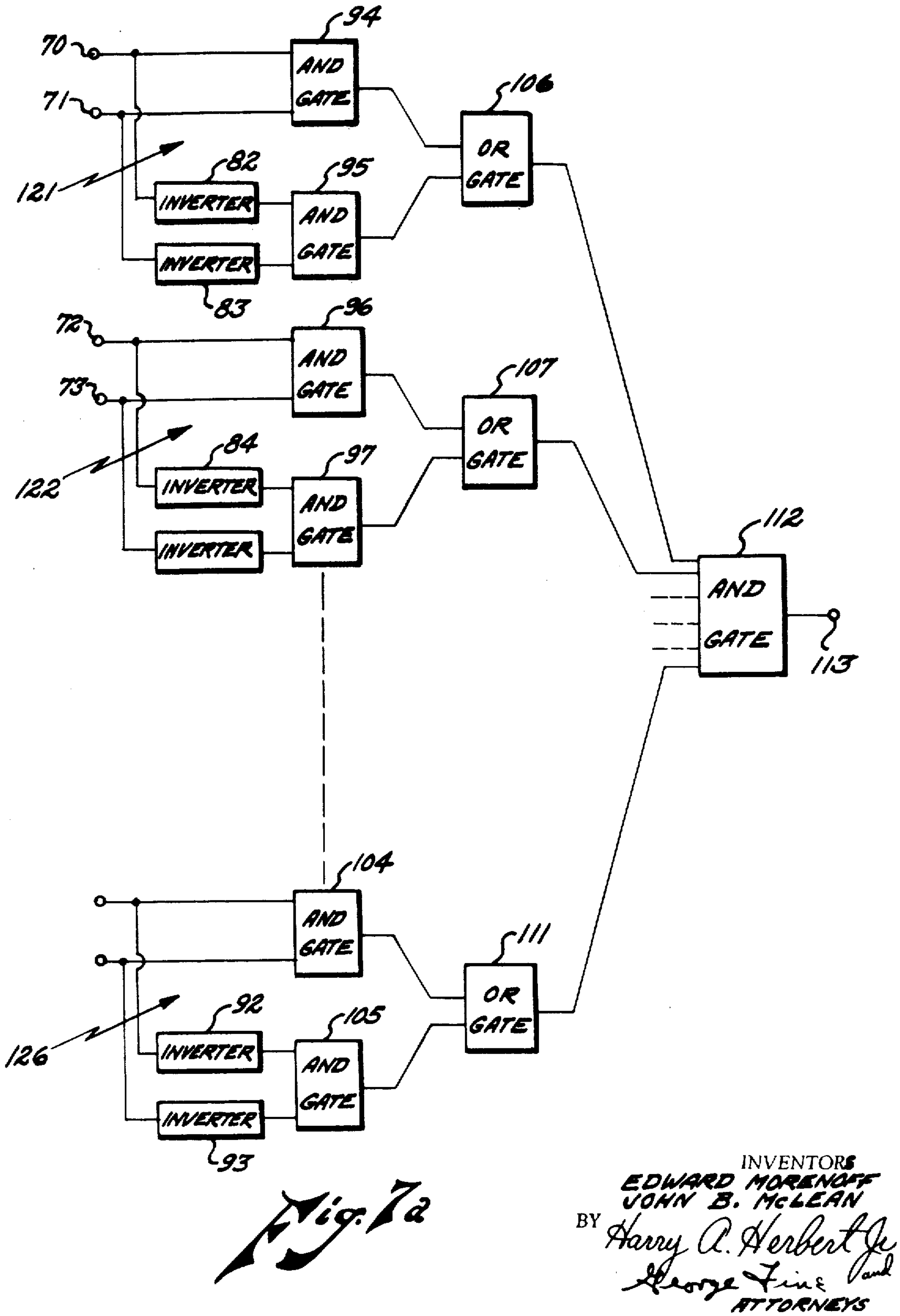
FIG. 7*a* shows the logic diagram for the Buffer Marker Comparator of FIG. 7.

A typical logical circuit which can perform the functions of Buffer Marker Comparator 50 is shown in FIG. 7A. There is provided six pair of signal channels 121-126 whose outputs are fed to "and" gate 112. The structure and operation of channel pair 121 is representative of each of the channels. Channel 121 is comprised of input terminals 70 and 71 which feed simultaneously "and" gate 94 and inverters 82 and 83. The output of inverters 82 and 83 are fed to "and" gate 95. The outputs of "and" gates 94 and 95 are fed to "or" gate 106 and the output of "or" gate 106 is fed to "and" gate 112. In the operation of channel pair 121, the input signals thereto are provided by Buffer File Control Registers 51-58 shown in FIG. 7. However, for a more detailed explanation reference is had to FIG. 3 which is symbolic representation of the structure of a representative Buffer File Control Register. Write Buffer Marker bits 40 to 45 are fed to terminals 70, 72, 74, 76, 78 and 80. Read Buffer Marker bits 56 to 61 are fed to terminals 71, 73, 75, 77, 79, and 81. The input signal pair to terminals 70 and 71 are fed to "and" gate 94, if they are both "1." Then an output is provided to "or" gate 106. Simultaneously they are fed to inverters 82 and 83 which then provide a "0" output to "and" gate 95. "Or" gate 106 then provides an output to "and" gate 112. If both the input signals to terminals 70 and 71 are "0" then "and" gate 94 does not provide an output. However, inverters 82 and 83 provide a "1" output signal which is fed to "and" gate 95 which in turn provides an output to "or" gate 106. The output from "or" gate 106 is then fed to "and" gate 112. If the pair of input signals to terminals 70 and 71 are not equivalent to each other no output is provided to "and" gate 112. To summarize each input pair must be identically equivalent to provide an output. Only if the six pair of input signals are identically equivalent then "and" gate 112 will provide an output signal at terminal 113.

In summary of the structure and operation of the Linker shown in FIG. 7, magnetic core storage 61 is used for the storage of programs, data, and control information such as the Buffer File Control Words, the Access Control Selector Word and the BFCR Translation Vector prior to their transfer to Buffer File Control Registers 51-58, Access Control Selector Register (ACSR) 67 and BFCR Symbolic Designation Translator (BSDT) 66, respectively. Memory Address Register 60 contains the address of the operand or instruction currently being referenced in the magnetic core storage. Transient Storage Register 62 temporarily holds the operands being transferred to or from magnetic core storage 61 and the instructions being read out of magnetic core 61. The operands are sent to Accumulator Register 63 or other registers if so specified in the instruction being executed. Instructions are sent to Current Instruction Register 64. The Operation Code of the instruction is interpreted by Op Code Decoder Circuits 68 and necessary control and timing signals generated in conjunction with Execution Control Circuitry 68. The contents of the address field of the instruction are sent to Memory Address Register 64 via Address Translation and Relocation Circuits 59 where logical addresses are converted to physical, machine address. These registers may have different names in different computers and may be supplemented by a wide variety of additional circuitry which also differs in different computers. The functions they perform however, exists in essentially all general purpose digital computers and it is with these functions that the Buffer File Computer Program Communication and Linkage Mechanism is interfaced.

Buffer File Control Registers (BFCR) contains the information required for controlling the operation of a Buffer File. This information includes the location of the Buffer File in the computer storage, the size of the Buffer File, the positions of the Read and Write Buffer Markers and several indicators used for control purposes. Eight Buffer File Control Registers are provided. The Buffer File Control Register Symbolic Designation Translator (BSDT) 66 is used to convert the symbolic Buffer File Control Register designations contained in running programs to physical Buffer File Control Register designations at program execution time, thus facilitating the use of the Buffer File Control Registers by multiple programs. Access Control Selector Register (ACSR) 67 is used to restrict the access of running programs to allowable Buffer File Control Registers and to insure the unidirectional flow of data through a Buffer File. Buffer Marker Comparator 50 is used to compare the values of the Read and Write Buffer Markers. Op Code Decoder 65 is used to distinguish between new instructions incorporated in the Buffer File Computer Program Communication and Linkage Mechanism and existing commands normally found in the computer, to interpret these new commands, and to generate when appropriate the signals which differentiate between the eight possible symbolic Buffer File Control Register designations. Execution Control Circuits 68 is used in conjunction with the above named registers to provide the control and timing signals required for the execution of the thirteen instructions (referencing the Buffer Files, the Buffer File Control Registers, the Buffer File Control Register Symbolic Designation Translator and the Access Control Selector Register) as specified in the descriptions of these instructions and previously defined in this disclosure.

It is to be noted that FIGS. 3, 4, 5, and 6 are symbolic representations and as hereinbefore mentioned the circuitry utilized therein are of a conventional computer nature.

The implementation of the Linker shown in FIG. 7 in a computer's processing and control unit requires that a set of instructions be added to repertoire of the computer. Maximum use can be made of the logic and control circuitry normally found in the computer by defining the format of the new instructions so as to conform to the formats of the conventional instructions in the computer.

If the computer in which the Linker is implemented has a dense instruction set (that is, there are as many instructions in the repertoire of the computer as can be represented by the binary bits in the operation code field of the instruction), then one bit must be available in the instruction which can be used to distinguish the new instructions from the conventional computer instructions. If the instruction set is not dense, then some or all of the new instructions can be directly specified in the operation field of the instruction. If, however, the instruction set is dense, and there is no bit available for use as a new instruction designator, then either some of the conventional instructions in the computer must be relinquished, or the Linker cannot be reduced to hardware in that computer.

Figure 8:
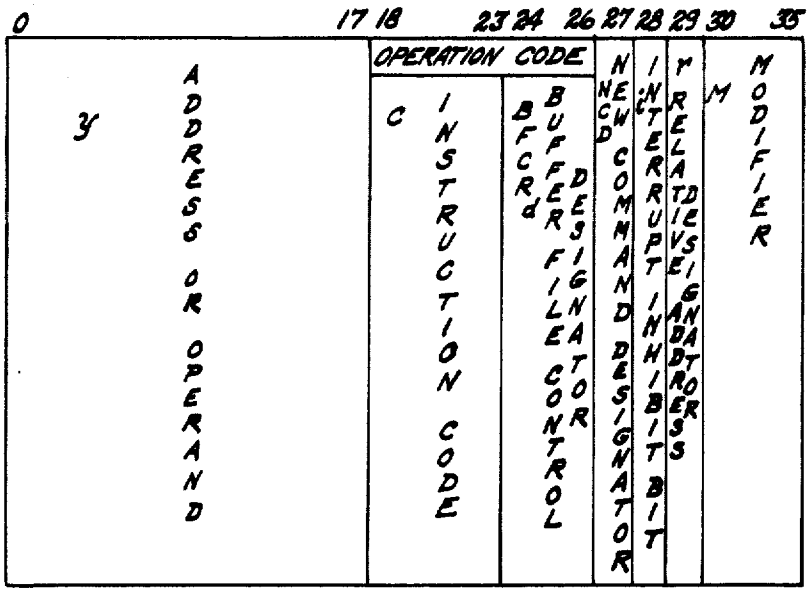
FIG. 8 shows the instruction format for the Linker shown in FIG. 7.

The instruction format for the Linker illustrated in FIG. 8 conforms to the basic GE-645 instruction format. Bit position #27, currently unused in the GE-645 instruction format, is used as the New Command Designator (NCD) bit. When the NCD is set to one, the operation code field of the instruction is treated in two parts. The first part is a 6-bit subfield, C, indicating one of 64 possible new instructions. The second part is a 3-bit subfield, $BFCR_d$, symbolically designating a Buffer File Control Register. The address field, *y*, is treated exactly as it would be in a conventional GE–645 instruction. The 18-bit address may be interpreted either as a one-dimensional physical machine address or as a two-dimensional logical address, depending upon the address mode of the computer. The remaining bits of the instruction word are also treated precisely as they are in a conventional GE–645 instruction. The address modification capabilities available to normal instructions are also available to the Linker instructions.

The Linker instructions are divided into two types, A and B. Type A instructions are executable only by the computer's monitor system. Type B instructions, on the other hand, are executable by any program running in the computer. The details of the mechanism employed in a computer to restrict the use of certain instructions to the monitor system is not germain to the implementation of the Linker in the computer. It is sufficient to note that such a mechanism exists as a basic feature of the GE–645.

Type A instructions refer to either BFCR Symbolic Designation Translator (BSDT) 66 or Access Control Selector Register (ASCR) 67. The BFCR Translation Vector (BTV), contained in BFCR Symbolic Designation Translator (BSDT) 66, can be generated and updated only by the monitor system. Hence, access to BFCR Symbolic Designation Translator (BSDT) 66 must be denied to all other programs. Similarly, if a running program was permitted to access an Access Control Selector Word (ACSW) in Access Control Selector Register (ACSR) 67, it would be possible for that program to alter the settings of the Access Control Selector Word contained in Access Control Selector Register (ACSR) 67, and thereby possibly gain access to an otherwise inaccessible Buffer File or Buffer File Control Register. Hence, all programs except the monitor system are denied access to Access Control Selector Register (ACSR) 67.

Type B instructions refer to the Buffer File or their associated Buffer File Control Registers. They are employed by programs to set up, transfer and terminate the transfer of data between the program and a Buffer File.

Two type A instructions are associated with the BFCR Symbolic Designator Translator (BSDT). The first instruction causes the contents of BFCR Symbolic Designation Translator (BSDT) 66 to be transferred to Accumulator Register 63. The second instruction causes the contents of Accumulator Register 63 to be transferred to BFCR Symbolic Designation Translator (BSDT) 66.

Figure 9:
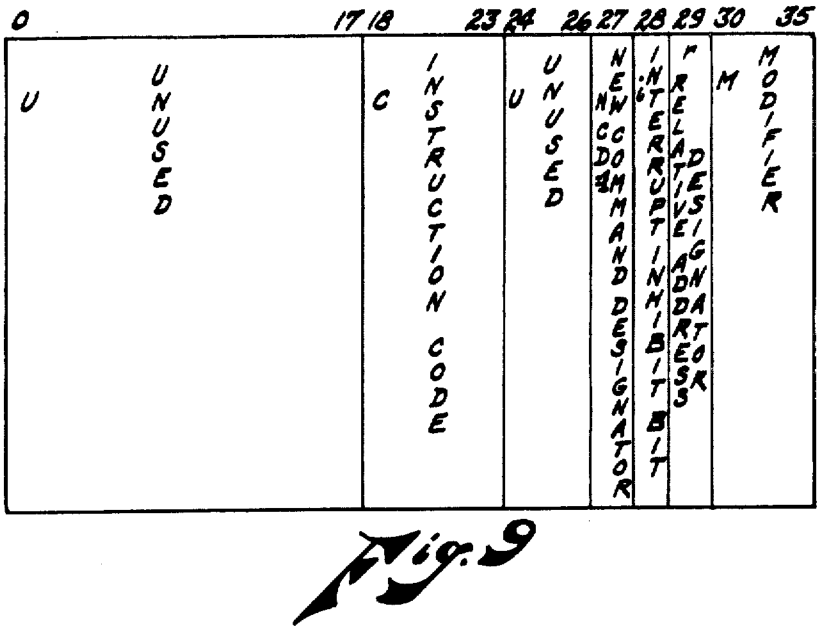
FIG. 9 shows the format for the WRITE BSCD, READ BSCD, WRITE ACSR, and READ ACSR instructions.

Since there is only a single BFCR Symbolic Designation Translator (BSDT) in the Linker and a single Accumulator Register in the GE–645 processing and control unit, it is unnecessary to specify any addresses for these transfers. The address fields of these intruction are therefore unused. (See FIG. 9.) In the event the Linker was implemented in a computer with multiple Accumulator Registers, part of the address field could be used to specify which Accumulator Register was involved in the transfer with the BFCR Symbolic Designation Translator (BSDT).

Figure 10:
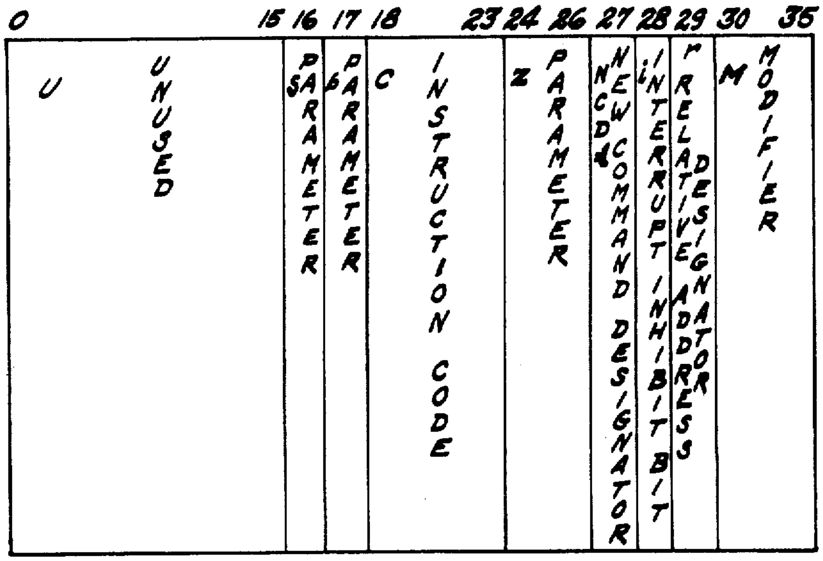
FIG. 10 shows the format for SETB ACSR and CLEARB ACSR instruction.

Four type A instructions are associated with Access Control Selector Register (ACSR) 67. The first two permit data to be transferred between Accumulator Register 63 and Access Control Selector Register (ACSR) 67. The format of these two instructions is identical to the format of the two comparable instructions associated with BFCR Symbolic Designation Translator (BSDT) 66. (See FIG. 9.) The third and fourth of these instructions permit (ACSW) to be set and cleared, respectively, while contained in Access Control Selector Register (ACSR) 67. (See FIG. 10.)

The parameter "*b*" is used to indicate which subfield of Access Control Selector Register (ACSR) 67 contains the bit to be set or cleared. If "*b*" is zero, the bit is in the Total Access Control Field (TACF) subfield. If, however, "*b*" is one, the bit is the partial Access Control Field (PACF) subfield. The parameter "*z*" is used to specify which of the 8-bits in the specified Access Control Selector Register (ACSR) subfield is to be set or cleared. The parameter "*s*" determines whether the "*z*" designation is symbolic or physical. If "*s*" is one, the reference is symbolic and must be converted to a physical machine reference using BFCR Symbolic Designation Translator (BSDT) 66. If, however, "*s*" is zero, the reference is made directly to one of the eight physical Buffer File Control Registers 51–58.

No explicit commands are required to test the bits of Access Control Selector Register (ACSR) 67. Hardware is provided in the Linker which implicitly causes the condition of the bits in the Access Control Selector Register (ACSR) corresponding to a Buffer File Control Register (BFCR) or Buffer File being referenced by type B instructions to automatically be tested prior to permitting the execution of any of these instructions to proceed.

As a result of the strong similarity between the instructions for either reading or writing BFCR Symbolic Designation Translator (BSDT) 66 and Access Control Selector Register (ASCR) 67, each of these instruction pairs can be replaced by a single instruction which treats BFCR Symbolic Designation Translator (BSDT) 66 and Access Control Selector Register (ACSR) 67 as a single 40-bit register. The pair of instructions for reading BFCR Symbolic Designation Transistor (BSDT) 66 and Access Control Selector Register (ACSR) 67 can be replaced by a single instruction which transfers the contents of Access Control Selector Register (ACSR) 67 to the lower order 16-bits of Accumulator Register 63 and the contents of BFCR Symbolic Designation Translator (BSDT) 66 to the next higher order 24-bits. Similarly, the pair of instructions for loading BFCR Symbolic Designation Translator (BSDT) 66 and Access Control Selector Register (ACSR) 67 can be replaced by a single instruction which transfers the lower order 16-bits of the Accumulator Register to Access Control Selector Register (ACSR) 67 and the next higher order 24-bits to BFCR Symbolic Designation Translator (BSDT) 66. Use of these combined instructions reduces the overhead associated with the loading of BFCR Symbolic Designation Translator (BSDT) 66 and Access Control Selector Register (ACSR) 67 by the monitor system prior to turning control of the computer to one of the programs to be executed.

Two type B instructions are associated with the Buffer File Control Registers. The first instruction causes the contents of a specified Buffer File Control Register (BFCR) to be transferred to a specified location in core storage. The second instruction causes the contents of a specified location in core storage to be transferred to a specified Buffer File Control Register (BFCR).

Figure 11:
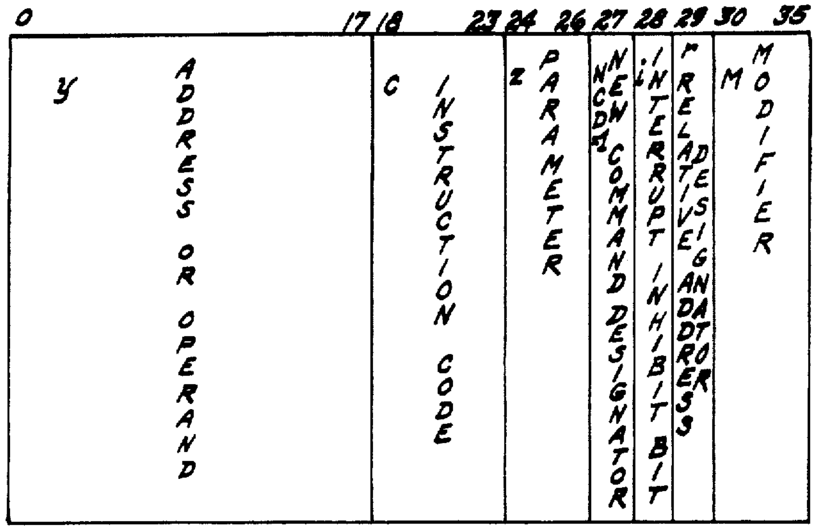
FIG. 11 shows the format of the LOAD BFCW and STORE BFCW instructions.

The location in core involved in the exchange with the Buffer File Control Register (BFCR) is indirectly specified. The address field of the instruction contains the indirect address of the operand, that is the location in core storage where the core storage location involved in the transfer may be found. The contents of the address field may be either a physical machine address or a logical address, depending on the address mode of the computer. The referenced Buffer File Control Register (BFCR) is symbolically designated by the parameter "*z*," contained in the $BFCR_d$ subfield of the operation code field of the instruction. (See FIG. 11.)

Five type B instructions are associated with the transfer of data to and from a Buffer File. There are two variations of the read instruction and two variations of the write instruction. In each case, the first variation causes the transfer of a word between Accumulator Register 63 and the Buffer File while the second variation causes a transfer between a specified location in core storage and the Buffer File. The fifth instruction indicates the termination of writing data to a Buffer File.

When the data transfer is between Accumulator Register 63 and the Buffer File, the address field of the instruction is unused. The Buffer File involved in the transfer is uniquely identified by the parameter "z," contained in the $BFCR_d$ subfield of the instruction, which symbolically specifies the Buffer File Control Register (BFCR) containing the Buffer File Control Word (BFCW) associated with the Buffer File. The existance of only a single Accumulator Register in the GE-645 precludes the identification of the Accumulator Register involved in the transfer.

Figure 12:
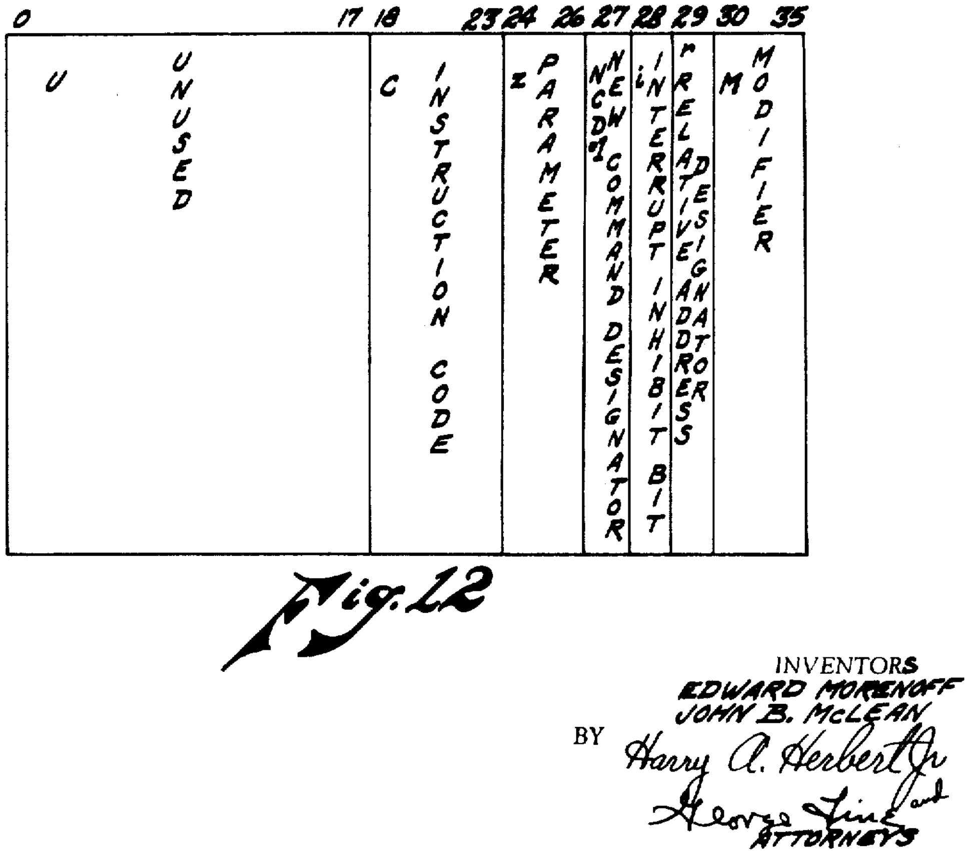
FIG. 12 shows the format of the WRITEA BUFFER FILE and READA BUFFER FILE instructions.

The execution of the first variation of the read and write instructions requires the use of a standard index register specified by conventional means in the GE-645. The index register is preset with the number of words to be transferred between the Accumulator Register and the Buffer File. This value is decremented in the usual manner each time a word is transferred. (See FIG. 12.)

The execution of the instruction to write data from the Accumulator Register to the specified Buffer File is analogous to the read operation just described. The main distinction is that in this case it is not necessary to test the state of the Buffer File Complete Indicator (BFCI).

Figure 13:
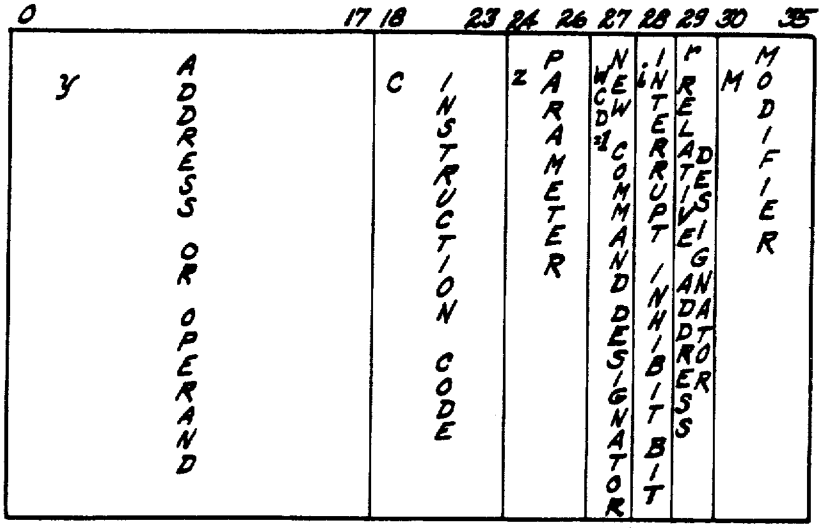
FIG. 13 shows the WRITEC BUFFER FILE and READC BUFFER FILE instructions.

When the data transfer is between the Buffer File and the specified location in core storage rather than the Accumulator Register, the address field contains the address of the core location involved in the data transfer. This can be either a one-dimensional physical address or a two-dimensional logical address, depending on the address mode of the computer. This is the main distinction between this pair of instructions and the WRITE BUFFER FILE and READ A BUFFER FILE instruction. (See FIG. 13.)

Figure 14:
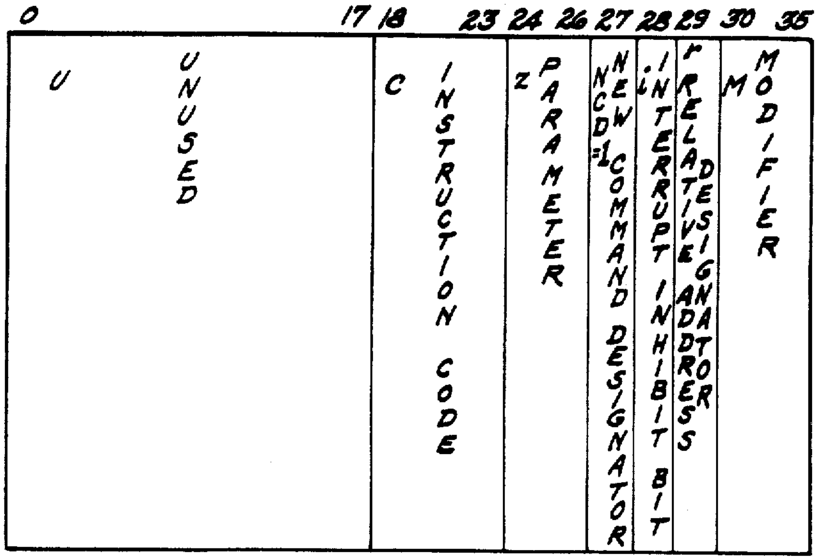
FIG. 14 shows the format of the COMPLETE BUFFER FILE instruction.

The fifth instruction which references the Buffer File is used to terminate the write operation. The address field of the instruction is unused. The Buffer File to which the instruction refers is identified by the parameter "z," contained in the $BFCR_d$ subfield of the instruction. (See FIG. 14.)

Hereinafter a typical set of assembly language level instructions which can facilitate the use of the Linker and how they may be implemented in the environment of the GE-645 are considered. These instructions may also be incorporated into compiler languages.

First, an instruction is needed by which a program can request the creation of a Buffer File. The general format of this instruction is: OPEN BUFFER FILE *ALPHA, M, N, *g*. The significance of the asterisk preceding the name of the Buffer File, ALPHA, is to indicate that at linkage definition time the names of the output and input Buffer Files of the program to be linked are to be equated. Inclusion of M and N in the format enables preferred block and file sizes, respectively, to be specified. It should be noted that the values recommended in the program may either be accepted or ignored by the monitor system in the actual assignment of block and file sizes.

The parameter "*g*" is used to specify whether or not the program is to be allowed to continue if the operation directed at the referenced Buffer File should have to be delayed waiting for additional data or space in the Buffer File. If "*g*" equals one, the program is to continue its execution of instructions not referencing the delayed Buffer File. If "*g*" equals zero or the parameter is omitted, the further operation of the program is inhibited.

When the program is assembled, the symbolic Buffer File name is associated with an indirect Buffer File Control Word (BFCW) address, that is the address of the storage location where the address of the corresponding Buffer File Control Word (BFCW) can be found during the execution of the program. The content of the indirect Buffer File Control Word (BFCW) address, hereafter referred to as the indirect Buffer File Control Word (BFCW) word, is left blank at assembly time.

Figure 15:
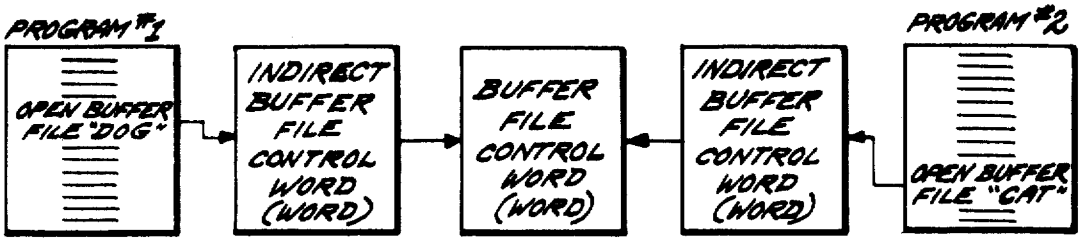
FIG. 15 shows the linking of programs by indirect BFCW address assignment.

The indirect Buffer File Control Word ((BFCW) word remains blank until the OPEN BUFFER FILE instruction is reached in the execution of the program. At that time, the monitor system generates the corresponding Buffer File Control Word (BFCW), stores it somewhere within the area of storage dedicated for the use of the monitor system, and enters this address in the indirect Buffer File Control Word (BFCW) word. Equating the symbolic names of the output and input Buffer Files at linkage definition time results in the same Buffer File Control Word (BFCW) address being entered into the indirect Buffer File Control Word (BFCW) words corresponding to the specified Buffer File in each of the programs to be linked. The manner in which this establishes the correspondance between the Buffer File Control Word (BFCW) and the symbolic name of each of the Buffer File to be linked is illustrated in FIG. 15.

The operation of the assembler system is such that successive locations in core storage are assigned as indirect Buffer File Control Word (BFCW) addresses for Buffer File Control Words corresponding to the Buffer Files named in successive OPEN BUFFER FILE instructions in the program. Within the context of the GE-645, the indirect Buffer File Control Word (BFCW) addresses may be assigned in either of two ways, depending on the address mode in which the program is assembled.

Figure 16:
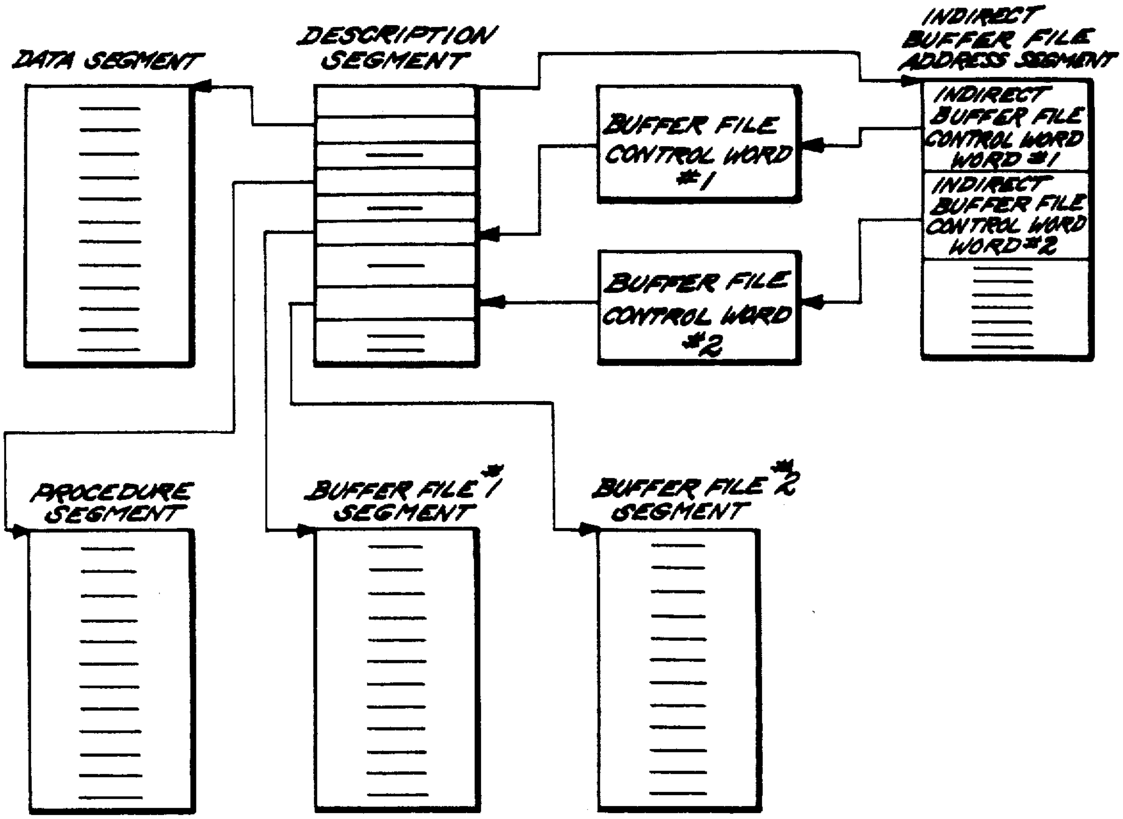
FIG. 16 shows the relationship of IBFA Segment to other program segments.

If the two-dimensional, logical address mode is used, the indirect Buffer File Control Word (BFCW) addresses in a program are contained in a special segment associated with that program known as the Indirect Buffer File Control Word (BFCW) Address Indirect BFCW Address (IBFA) Segment. Indirect Buffer File Control Word (BFCW) words corresponding to successively named Buffer Files in the program are assigned successive segment addresses in the Indirect BFCW Adresss (IBFA) Segment of that program. The Indirect BFCW Address (IBFA) Segment may be accessed only on a read basis by its associated program, and not at all by any other running program. The relationship of the Indirect BFCW Address (IBFA) Segment to the other segments of the program is shown in FIG. 16. The Descriptor Segment, Data Segment and Procedure Segment, together with a Linkage Segment (not shown in FIG. 16) are normally associated with a program. It should be noted that each Buffer File is itself a segment subject to the constraint of a undirectional flow of data.

Figure 17:
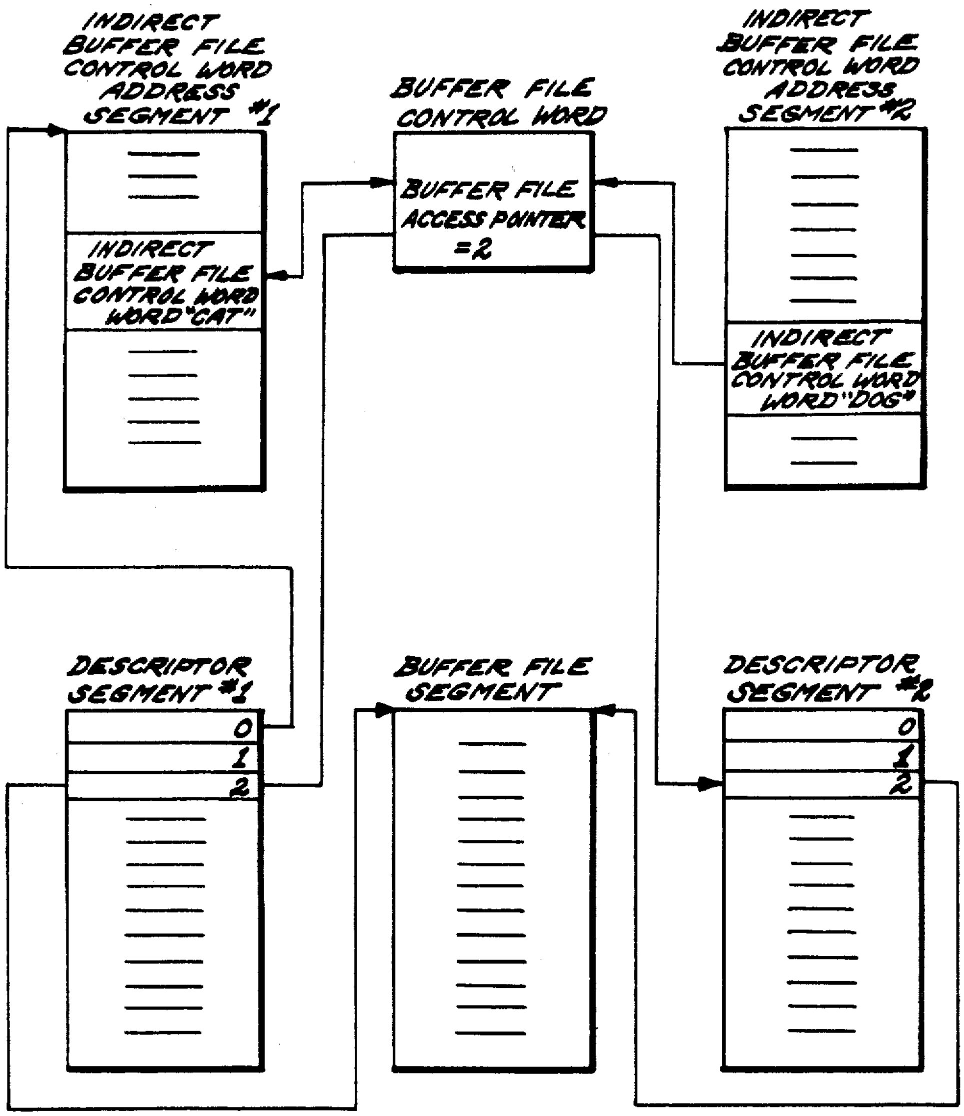
FIG. 17 shows the assignment of equivalent segment numbers to linked Buffer Files.

A technique which may be employed to enable two programs to reference the same Buffer File Control Word (BFCW) is shown in FIG. 17. Descriptor Segments #1 and #2 are associated with programs #1 and #2, respectively, which are to be linked through the Buffer Files named CAT and DOG. When thet first of the programs to be linked reaches the OPEN BUFFER FILE instruction in its execution referencing one of the two Buffer File names equated at linkage definition time, the monitor system assigns a segment number to the Buffer File with respect to that program's Descriptor Segment and places this value in the Buffer File Address Pointer (BFAP) field of the Buffer File Control Word (BFCW). When the second program reaches the corresponding OPEN BUFFER FILE instruction in its execution, the monitor system checks to see if a segment number has already been requested for the Buffer File and determines what value has been assigned to it. If this segment number is already associated with another segment in the second program, the next available segment number in the second program is assigned to the Buffer File and the segment number is changed in the first program. The Buffer File Address Pointer (BFAP) now references the same segment number in each of the two Descriptor Segments of the two programs to be linked.

The iterative process of assigning a common segment number to Buffer Files whose names have been equated can be facilitated by arbitrarily reserving the first "*x*" locations in the Descriptor Segment of each program for the use of Buffer File specification.

If the one-dimensional absolute addressing mode is used, then the indirect Buffer File Control Word (BFCW) addresses in a program are assigned physical machine addresses by the assembly system. Since the monitor system is now unable to employ a segment number in the Program Descriptor Segment to distinguish between indirect Buffer File Control Word (BFCW) addresses in different running programs, other means must be employed to accomplish this function. For example, the monitor system loader might check all programs brought into core storage for indirect Buffer File Control Word (BFCW) addresses, designate unique core store locations for all common indirect Buffer File Control Word (BFCW) address references within a single program and replace the indirect Buffer File Control Word (BFCW) address references found within the instructions of the programs being loaded with the corresponding uniquely designated values.

Before attempting to reference a Buffer File, the associated Buffer File Control Word (BFCW) must first be transferred from its location in core storage (specified in the indirect BFCW address) to the specified Buffer File Control Register (BFCR). This is done using an instruction of the form: LOAD BFCW *ALPHA. ALPHA is the name of the Buffer File defined in an OPEN BUFFER FILE instruction preceding the LOAD BFCW instruction in the program. When the program is assembled, the assembler system replaces the Buffer File name ALPHA by the indirect Buffer File Control Word (BFCW) address associated with the named Buffer File in the corresponding OPEN BUFFER FILE instruction. The assembler also assigns, *z*, the symbolic Buffer File Control Register (BFCR) name thereafter associated with the named Buffer File. The indirect Buffer File Control Word (BFCW) address is placed in the address field of the instruction word and the symbolic Buffer File Control Register (BFCR) name in the $BFCR_d$ subfield. The operation of the assembler is such that successive Buffer File Control Registers, from one through eight, are associated with each named Buffer File in successive OPEN BUFFER FILE instructions. Techniques similar to those developed for the allocation of index registers in conventional computers can be applied to make the Buffer File Control Register (BFCR) assignment function more sophisticated.

An instruction is also needed to transfer the Buffer File Control Word (BFCW) from a specified Buffer File Control Register (BFCR) to a location in core storage specified in the indirect Buffer File Control Word (BFCW) address. The form of this instruction is: STORE BFCW *ALPHA. The treatment of this instruction by the assembler is analogous to the treatment of the LOAD Buffer File Control Word (BFCW) instruction.

It has been previously noted that there are two variations of the Buffer File read and write instructions. The first variation allows for the transfer of data between the Accumulator Register and the Buffer File, while the second allows the transfer of data between a specified location in core storage and Buffer File.

The format of the two instructions involving the Accumulator Register are: WRITEA BUFFER FILE *ALPHA, READA BUFFER FILE *ALPHA, ALPHA is the name of the Buffer File which previously appeared in the LOAD BFCW and OPEN BUFFER FILE instructions preceding the WRITEA BUFFER FILE or READA BUFFER FILE instructions in the program. At assembly time the assembler system replaces the Buffer File name by a 3-bit field containing the same value of *z* previously associated with the same named Buffer File in preceding LOAD BFCW instruction.

Since the execution of either of these instructions results in the transfer of a single word between the Accumulator Register and a Buffer File location in storage, the transfer of a block of M words to or from a Buffer File will, in general, require the execution of a programmed loop in which the READA BUFFER FILE or WRITEA BUFFER FILE instructions are embedded.

The formats of the two instructions involving the transfer of data between a specified location in core storage and the Buffer File are: WRITEC BUFFER FILE *ALPHA, BETA, READC BUFFER FILE *ALPHA, BETA. ALPHA is interpreted in precisely the same manner as described for the first variation of the read and write instructions. BETA is the symbolic reference to the core area involved in the data transfer with the Buffer File name ALPHA. Depending on the address mode used when the program is assembled BETA is replaced by either a segment name and segment address or by an absolute machine address.

An instruction is needed by which the program writing data to an output Buffer File can indicate when there is no more data to be written. The format of this instruction is: COMPLETE BUFFER FILE *ALPHA. ALPHA is interpreted in precisely the same manner as previously described. When the program is assembled, the assembler replaces the Buffer File name by a 3-bit field containing the same value of *z* previously associated with the same named Buffer File is the LOAD BFCW instruction preceding it in the program.

The effect of this instruction is to cause the Buffer File Complete Indicator to be set in the Buffer File Control Word (BFCW). When the program reading data from the Buffer File has read all the data for the Buffer File (as indicated by the equality of the Read and Write Buffer Marker positions) and this indicator is set, then the Buffer File is no longer needed for inter-program communication by either of the two programs involved. The monitor system may then destroy the Buffer File, thus breaking the inter-program linkage.

Thereinafter is provided the instruction execution sequence which includes first the Read Buffer File to Accumulator Instruction wherein the New Command Dessignator (NCD) is first tested to determine if the instruction being executed is a Linker instruction. If the New Command Designator (NCD) is one, the command subfield of the operation code field of the instruction is decoded and the symbolic Buffer File Control Register (BFCR) designation contained in the $BFCR_d$ subfield translated to a physical designation using the BFCR Symbolic Designation Translator (BSDT).

The bit in the Total Access Control Field (TACF) subfield of the Access Control Selector Register (ACSR) corresponding to the physical Buffer File Control Register (BFCR) designation is next tested. If that bit is one, the further execution of the instruction is inhibited and the next instruction taken from the fixed location (R1) in the monitor system area of core storage, rather than from the running program. If the bit being tested is zero, the execution of the instruction is permitted to continue.

The corresponding bit in the Partial Access Control Field (PACF) subfield of the Access Control Selector Register (ACSR) is then tested. A bit value of zero causes the further execution of the instruction to be inhibited and the next instruction taken from the fixed location (R2) in the monitor system area of core storage. A bit value of one allows the execution of the instruction to continue.

The Inhibit Read Buffer Indicator (IRBI) is next tested. An Inhibit Read Buffer Indicator (IRBI) value of one, indicating that additional data must be placed in the Buffer File by another program before the currently running program can continues its read operation, causes the reading of the Buffer File to be inhibited. The Non Block Read Indicator (NBRI) is tested and if found to be zero, the next instruction is taken from the fixed location (R3) in the monitor system area of core storage. The program is thus delayed from further execution until additional data is placed into the Buffer File by another program. On the other hand, if the Non Block Read Indicator (NRBI) is one, the next instruction is taken from the running program, at the *third* location following the READA BUFFER FILE instruction currently being executed. The program is thus able to continue to be executed although it is unable to read data from the Buffer File. If the Inhibit Read Buffer Indicator (IRBI) is zero, the execution of the READA BUFFER FILE instruction is permitted to continue.

At this point in the instruction execution sequence, the Address Mode Selector (AMS) bit is examined to determine whether the Buffer File Addrress Pointer (BFAP) is to be treated as a physical machine or logical address. If the Address Mode Selector (AMS) is one, the address of the next word to be read from the Buffer File is obtained by offsetting the value of the Buffer File Address Pointer (BFAP) address by the 16-bits contained in the combined Read Buffer Marker (RBM) and Read Word Count (RWC) subfields of the Buffer File Control Word (BFCW). If, however, the Address Mode Selector (AMS) is zero, the physical address must be developed from the logical addressing using the address translation and location circuits of the GE-645. The Buffer File Address Pointer (PFAP) specifies the segment number and the combined Read Buffer Marker (RBM) and Read Word Count (RWC) subfields specify the segment address of the word to be read from the Buffer File.

Once the physical machine address of the Buffer File to be read has been determined, two events may proceed concurrently. On the one hand, the Buffer File word is transferred from the specified location in core storage to the Accumulator Register and the specified index register decremented by one. When the value of the index reaches zero, the Read Word Count (RWC) is rcycled to zero. On the other hand, the value of the Read Word Count (RWC) is incremented by one in the Buffer File Control Register (BFCR). The addition is performed modulo M, where M is determined by the value of the Block Size Selector (BSS) field in the Buffer File Control Register (BFCR).

A block overflow signal is generated when the Read Word Count (RWC) recycles back to zero. In the absence of the block overflow signal the next instruction is taken from the running program at the *second* location following the READA BUFFER FILE instruction currently being executed. In the presence of a block overflow signal the Read Buffer Marker (RBM) is incremented by one. The addition is performed modulo N, where N is determined by the value of the N field in the Buffer File Control Register (BFCR).

A file overflow signal is generated when the Read Buffer Marker (RBM) recycles back to zero. In the presence of this signal, the Buffer File Recycle Indicator (BFRI) is inverted. Since this is a read command, the inversion is from one to zero. In the absence of the file overflow signal the Buffer File Recycle Indicator (BFRI) remains unchanged.

The values of the Read Buffer Marker (RBM) and Write Buffer Marker (WBM) are then compared in the Buffer Marker Comparator (BMC). If the output from the Buffer Marker Comparator (BMC) is a signal to the effect that the Read Buffer Marker (RBM) and Write Buffer Marker (WBM) are unequal, a test is made of the Inhibit Write Buffer Indicator (IWBI). If the Inhibit Write Buffer Indicator (IWBI) is one, it is set to zero and a test made of the Non Block Write Indicator (NBWI). A value of the Non Bolck Write Indicator (NBWI) corresponding to zero causes the next instruction to be taken from the location immediately following the READA BUFFER FILE instruction currently being executed. Conversely, an Non Block Write Indicator (NBWI) value of one causes the next instruction to be taken from a specified, fixed location ($R_3$) in the monitor system area of core storage. This provides the mechanism by which the monitor system can note that the program previously unable to execute those instructions associated with the filled Buffer File can hereafter execute them. If the Inhibit Write Buffer Indicator (IWBI) is zero, the next instruction is taken from the location immediately following the READA BUFFER FILE instruction currently being executed.

If, however, the output from the Buffer Marker Comparator (BMC) is a signal to the effect that the Read Buffer Marker (RBM) equals the Write Buffer Marker (WBM), the Buffer File Recycle Indicator (BFRI) value of one, indicating that all the data currently contained in the Buffer File have been read, causes the Inhibit Read Buffer Indicator (IRBI) to be set to one. Conversely, a Buffer File Recycle Indicator (BFRI) value of one leaves the Inhibit Read Buffer Indicator (IRBI) unchanged.

Finally, the Buffer File Complete Indicator (BFCI) is tested. A Buffer File Complete Indicator (BFCI) value of one, indicating that no more data will be placed in the Buffer File to be read, causes the next instruction to be taken from a specified, fixed location ($R_5$) in the monitor system area of core storage. A Buffer File Complete Indicator (BFCI) value of zero, causes the next instruction to be taken in sequence from the location immediately following the READA BUFFER FILE instruction whose execution has just been completed.

In the event that the Non Block Read Indicator (NBRI) bit was set to one (indicating that the operation of the program should proceed even though additional data was not in the Buffer File to be read by the program) then, when additional data is finally placed into the Buffer File by another program, the execution of the other program is interrupted and the next instruction taken from a specified, fixed location ($W_5$) in the monitor system area of core storage so that the occurrence of this event can be noted. Under this condition, when control is eventually returned to the program reading data from the Buffer File, it is to an instruction whose location is four positions following the originally inhibited READA BUFFER FILE instruction. The location of the last instruction in that program to be executed prior to control being taken away by the monitor system appears either in the location five positions following the originally inhibited READA BUFFER FILE instruction or in a specified location of a data block if the program is re-entrant.

To terminate the Buffer File Write instruction, the New Command Designator (NCD) is first tested to determine if the instruction being executed is a Linker instruction. If the New Command Designator (NCD) is one, the command subfield of the operation code field of the instruction is decoded and the symbolic Buffer File Control Register (BFCR) designation contained in the $BFCR_d$ subfield translated to a physical Buffer File Control Register (BFCR) designation using the BFCR Symbolic Designation Translator (BSDT).

The bit in the Total Access Control Field (TACF) subfield of the Access Control Selector Register (ACSR) corresponding to the physical (BFCR) designation is then tested. If that bit is one, the further execution of the instruction is inhibited and the next instruction taken from a fixed location (C1) in the monitor system area of core storage, rather than from the running program. If the bit being tested is zero, the execution of the instruction is permitted to continue.

The corresponding bit in the Partial Access Control Field (PACF) subfield of the Access Control Selector Register (ACSR) is then tested. A bit value of zero, indicating that the program has write access to the Buffer File, together with a Buffer File Complete Indicator (BFCI) to be set to one. If, however, the Buffer File Complete Indicator (BFCI) was already set to one, indicating the program previously terminated the write operation, then a bit value of zero in the Partial Access Control Field (PACF) causes the further execution of the instruction to be inhibited and the next instruction to be taken from a fixed, specified location (C2) in the monitor system area of core, rather than from the running program.

A bit value of one in the Partial Access Control Field (PACF) subfield of the Access Control Selector Register (ACSR) indicates the program in operation does not have write access to the Buffer File. In such a case the further execution of the instruction is inhibited and the next instruction is taken from a fixed, specified location (C3) in the monitor system area of core, rather than from the running program.

To provide the Load and Store Buffer File Control Word (BFCW) instructions, the New Command Designator (NCD) is first tested to determine if the instruction being executed is a Linker instruction. If the New Command Designator (NCD) is one, the command subfield of the operation code field of the instruction is decoded and the symbolic Buffer File Control Register (BFCR) designation contained in the $BFCR_d$ subfield translated to a physical Buffer File Control Register (BFCR) designation using the BFCR Symbolic Designation Translator (BSDT).

The bit in the Total Access Control Field (TACF) subfield of the Access Control Selector Register (ACSR) corresponding to the physical Buffer File Control Register (BFCR) designation is then tested. If that bit is one, the further execution of the instruction is inhibited and the next instruction taken from the fixed location (B1) in the monitor system area of core storage, rather than from the running program. If the bit being tested is zero, the execution of the command is permitted to continue.

In the case of a load Buffer File Control Register (BFCR) instruction, the contents of the storage location indirectly specified by the address field of the instruction are transferred to a Buffer File Control Register (BFCR) specified by the parameter "z" (and translated by the BSDT). Similarly, in the case of the store Buffer File Control Register (BFCR) instruction, the contents of the Buffer File Control Register (BFCR) specified by the parameter "z" (and translated by the BSDT) are transferred to the storage location indirectly specified by the address field of the instruction. The store Buffer File Control Register (BFCR) instruction is destructive in that the specified Buffer File Control Register (BFCR) contains all zeros at the completion of the instruction.

The Buffer File mode of operation provides a generic technique for linking programs being executed either in the same or different computers. This technique may be used to synchronize the execution of programs which would otherwise be operated completely asynchronously of one another. The Buffer File mode operation may also be used to pass partial results from one program while it is still in progress to a second program, and to transfer program state and condition information between programs.

The reduction of portions of the Buffer File control mechanism to hardware can increase the speed and reduce the software overhead associated with the Buffer File mode of operation. The hardware implementation of the Buffer File control mechanism on the GE–645 computer system is known as the Linker. The basic design features of the Linker are the provision for: (a) multiple Buffer File Control Registers (b) translation of symbolic to physical BFCR designations (c) Buffer File access rights verification and control. The Linker may be employed in both the one-dimensional physical address mode or the two-dimensional logical address mode of the GE–645. The format of the instructions and control words associated with the Linker have been chosen to facilitate their implementation on that computer. Variations may be expected when implemented on other computers.

Although Buffer File block and file sizes may be suggested within the program, they are arbitrarily set by the monitor system at program execution time. Hence, a program internally organized to operate most efficiently with a particular Buffer File block size may be linked with other programs with arbitrary Buffer File block sizes. A program may also indicate a preference to proceed in its execution when it would otherwise be delayed as a result of insufficient data or space in a Buffer File. This is possible subject to the constraint that no references to the delayed Buffer File are executed. This is particularly useful for the transfer of state information between programs.

Although the basic functions performed by the Linker remain essentially constant over a wide range of computers on which the Buffer File mode of operation may be employed, the details of the Linker implementation generally will vary from computer to computer.

We claim:

1. The method of synchronizing the execution of concurrently running first and second programs in the same computer prepared and executed without any knowledge of the characteristics of, or coordination with, each other comprising the steps of designating areas of core storage in the form of Buffer Files, conveying program state information between first and second programs executed in said computer by way of preselected Buffer Files, selecting a portion of the results being produced by a program in the form of data stream sections, passing the selected data stream sections from said first program to said second program in said computer by way of said preselected Buffer Files, selecting portions of said data stream already processed by said second program, concurrently processing with said first program the selected portions of said data stream already processed by said second program, and simultaneously and continuously processing the remainder of said data stream with said first program.

2. The method of synchronizing the execution of concurrently running programs in different computers prepared and executed without any knowledge of the characteristics of, or coordination with, each other comprising the steps of designating areas of random access auxiliary storage devices in the form of Buffer Files, conveying program state information between first and second programs executed in said computers by way of preselected Buffer Files, selecting a portion of the results being produced by a program in the form of data stream sections, passing the selected data stream sections from said first program to said second program in said computers by way of said preselected Buffer Files, selecting portions of said data stream already processed by said second program, concurrently processing with said first program the selected portions of said data stream already processed by said second program, and simultaneously and continuously processing the remainder of said data stream with said first program.

3. The method of synchronizing the execution of concurrently running programs in a computer by regulating the flow of information streaming between programs comprising the steps of designating areas of core storage, in the form of a Buffer File, permitting only a single program to read data from a specified Buffer File and another single program to write data to said specified Buffer File to establish a unidirectional data flow pattern, determining the availability of space in a Buffer File not containing data previously written by a program and not read by the other program, first allowing data to be written by by a program into a Buffer File only with space available in the Buffer File not containing data previously written by that program and not read by the other programs, determining areas of a Buffer File as yet unread by a program previously written by the other program, secondly allowing data to be read from a Buffer File by a program only from as yet unread areas previously written, determining the occurrence of the first and second allowance, and establishing an inhibit condition of the Buffer File failing to achieve the first and second allowance to produce a blocked Buffer File.

4. The method of synchronizing the execution of concurrently running programs as defined in claim 3 further including continuing other operations of the program not utilizing said blocked Buffer File.

5. The method of synchronizing the execution of concurrently running programs between first and second computers by regulating the flow of information streaming between programs comprising the steps of designating areas of random access auxiliary storage devices, in the form of a Buffer File, permitting only a single program to read data from a specified Buffer File and another single program to write data to said specified Buffer File to establish a unidirectional data flow pattern, determining the availability of space in a Buffer File not containing data previously written by a program and not read by the other program, first allowing data to be written by a program into a Buffer File only with space available in the Buffer File not containing data previously written by that program and not read by the other program, determining areas of a Buffer File as yet unread by a program previously written by the other program, secondly allowing data to be read from a Buffer File by a program only from as yet unread areas previously written by the other program, determining the occurrence of the first and second allowance, and establishing an inhibit condition of the Buffer File failing to achieve the first and second allowance thus producing a blocked Buffer File.

6. The method of synchronizing the execution of concurrently running programs in a computer by regulating the flow of information streaming between programs comprising the steps of designating areas of core storage in the form of a Buffer File, permitting only a single program to read data from a specified Buffer File and another single program to write data to said specified Buffer File to establish a unidirectional data flow pattern, determining the availability of space in a Buffer File not containing data previously written by a program and not read by the other program, first allowing data to be written by a program into a Buffer File only with space available in the Buffer File not containing data previously written by that program and not read by the other program, determining areas of a Buffer File as yet unread by a program previously written by the other program, secondly allowing data to be read from a Buffer File by a program only from as yet unread areas previously written by the other program, determining the occurrence of the first and second allowance, establishing an inhibit condition of the Buffer File failing to achieve the occurrence of the first and second allowance thus producing a blocked Buffer File, determining the occurrence of an inhibit condition, and removing the inhibit condition at a preselected time.

7. The method of synchronizing the execution of concurrently running programs as defined in claim 6 further including continuing other operations of the program not utilizing said blocked Buffer File.

References Cited

UNITED STATES PATENTS

| | | | |
|---|---|---|---|
| 3,229,260 | 3/1967 | Falkoff | 340—172.5 |
| 3,245,047 | 4/1966 | Blaauw et al. | 340—172.5 |
| 3,348,210 | 10/1967 | Ochsner | 340—172.5 |
| 3,374,465 | 3/1968 | Richmond et al. | 340—172.5 |
| 3,398,405 | 8/1968 | Carlson et al. | 340—172.5 |

PAUL J. HENON, Primary Examiner

M. E. NUSBAUM, Assistant Examiner